(12) United States Patent
Jaenisch et al.

(10) Patent No.: US 12,474,459 B2
(45) Date of Patent: Nov. 18, 2025

(54) OBJECT TRACKING USING SPATIAL VOTING

(71) Applicant: Raytheon Company, Arlington, VA (US)

(72) Inventors: Holger M. Jaenisch, Toney, AL (US); James W. Handley, Decatur, AL (US); Michael D. Dubois, Franklin, MA (US)

(73) Assignee: Raytheon Company, Arlington, VA (US)

( * ) Notice: Subject to any disclaimer, the term of this patent is extended or adjusted under 35 U.S.C. 154(b) by 481 days.

(21) Appl. No.: 17/278,135

(22) PCT Filed: Feb. 17, 2021

(86) PCT No.: PCT/US2021/018358
§ 371 (c)(1),
(2) Date: Mar. 19, 2021

(87) PCT Pub. No.: WO2021/230937
PCT Pub. Date: Nov. 18, 2021

(65) Prior Publication Data
US 2023/0096901 A1 Mar. 30, 2023

Related U.S. Application Data

(60) Provisional application No. 62/977,639, filed on Feb. 17, 2020.

(51) Int. Cl.
*G01S 13/42* (2006.01)
*G01S 13/72* (2006.01)

(52) U.S. Cl.
CPC .......... *G01S 13/42* (2013.01); *G01S 13/726* (2013.01)

(58) Field of Classification Search
CPC ........ G01S 13/42; G01S 13/44; G01S 13/726; H04L 65/1016; H04L 67/52; H04W 4/02
See application file for complete search history.

(56) References Cited

U.S. PATENT DOCUMENTS 7,328,206 B2   2/2008  Petculescu et al.
7,626,535 B2  12/2009  Ding et al.
(Continued)

FOREIGN PATENT DOCUMENTS

| WO | WO-2008098915 A1 | 8/2008 |
| WO | WO-2019198532 A1 | 10/2019 |
| WO | WO-2021080747 A1 | 4/2021 |
| WO | WO-2021230937 A2 | 11/2021 |
| WO | WO-2021230937 A3 | 11/2021 |

OTHER PUBLICATIONS

"International Application Serial No. PCT/US2020/053254, International Search Report mailed Dec. 9, 2020", 4 pgs.
(Continued)

*Primary Examiner* — Timothy A Brainard
(74) *Attorney, Agent, or Firm* — Schwegman Lundberg & Woessner, P.A.

(57) ABSTRACT

A method for tracking an object can include receiving first data input including first feature values of features that indicate a first position. The method can further include generating a first grid of cells representing an object track with the received feature values within an extent of the first grid of cells. The method can further include receiving second data input including second feature values of the features that indicate a second position. The method can further include, in response to determining the second feature values are within the extent of the first grid of cells adding a point corresponding to the second feature values to the first grid of cells to associate the point to an object track.

20 Claims, 15 Drawing Sheets

(56) References Cited

U.S. PATENT DOCUMENTS

| | | |
|---|---|---|
| 7,741,992 B2 | 6/2010 | Wang et al. |
| 8,805,858 B1 | 8/2014 | Ray |
| 9,157,992 B2 | 10/2015 | Wang et al. |
| 11,204,946 B2 | 12/2021 | Mozaffari |
| 2014/0162689 A1 | 6/2014 | Saldamli |
| 2015/0032723 A1 | 1/2015 | Khanolkar et al. |
| 2017/0011089 A1 | 1/2017 | Bermudez Rodriguez et al. |
| 2017/0247036 A1* | 8/2017 | Halder .................. B60W 40/02 |
| 2019/0279112 A1 | 9/2019 | Jaenisch et al. |
| 2021/0103029 A1* | 4/2021 | Liu ........................ G01S 13/931 |
| 2021/0124998 A1 | 4/2021 | Jaenisch et al. |
| 2021/0364600 A1* | 11/2021 | Kang ...................... G01S 13/52 |

OTHER PUBLICATIONS

"International Application Serial No. PCT/US2020/053254, Written Opinion mailed Sep. 12, 2020", 7 pgs.

"International Application Serial No. PCT/US2021/018358, International Search Report mailed Dec. 8, 2021", 4 pgs.

"International Application Serial No. PCT/US2021/018358, Written Opinion mailed Aug. 12, 2021", 10 pgs.

Fukunaga, K, et al., "The Estimation of the Gradient of a Density Function, with Applications in Pattern Recognition", IEEE Transactions on Information Theory, vol. IT-21, No. 1,, (Jan. 1975), 32-40.

Magalhaes, Salles V. G, et al., "PinMesh-Fast and exact 3D point location queries using a uniform grid", Computers and Graphics, Elsevier, GB, vol. 58, (May 17, 2016), 1-11.

"U.S. Appl. No. 16/664,408, Non Final Office Action mailed May 18, 2022", 8 pgs.

"U.S. Appl. No. 16/664,408, Notice of Allowance mailed Oct. 17, 2022", 9 pgs.

"U.S. Appl. No. 16/664,408, Response filed Aug. 18, 2022 to Non Final Office Action mailed May 18, 2022", 7 pgs.

"International Application Serial No. PCT/US2020/053254, International Preliminary Report on Patentability mailed May 5, 2022", 9 pgs.

"International Application Serial No. PCT/US2021/018358, International Preliminary Report on Patentability mailed Sep. 1, 2022", 12 pgs.

* cited by examiner

OBJECT TRACKING USING SPATIAL VOTING

CLAIM OF PRIORITY

This patent application claims the benefit of priority to U.S. Provisional Application Ser. No. 62/977,639, filed Feb. 17, 2020, which is incorporated by reference herein in its entirety.

RELATED APPLICATION

This application is related to U.S. patent application Ser. No. 16/664,408 titled "Classification Using Cascaded Spatial Voting Grids" and filed on Oct. 25, 2019, which is incorporated by reference herein in its entirety.

TECHNICAL FIELD

Embodiments relate to object tracking and object track association using information theoretic (IT) techniques.

TECHNICAL BACKGROUND

Object tracking techniques can include using global positioning systems (GPS) coordinates, signal intelligence signals (SIGINT), or video tracking. This information is not always available to perform object tracking. Object tracking techniques based on other information are desired.

BRIEF DESCRIPTION OF THE DRAWINGS

In the drawings, which are not necessarily drawn to scale, like numerals may describe similar components in different views, Like numerals having different letter suffixes may represent different instances of similar components. The drawings illustrate generally, by way of example, but not by way of limitation, various embodiments discussed in the present document.

DETAILED DESCRIPTION

Figure 1:
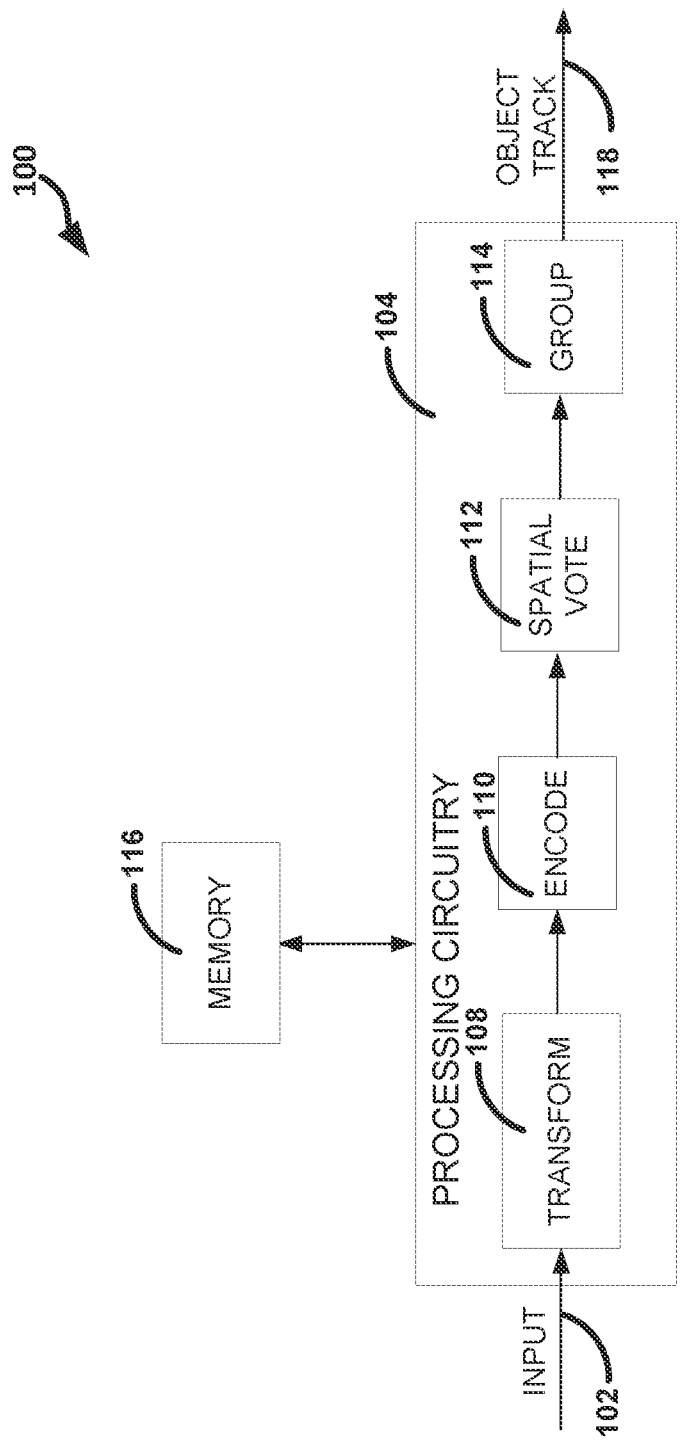
FIG. 1 illustrates, by way of example, a diagram of an embodiment of a system for spatial voting.

Embodiments regard methods, systems, and apparatuses for object tracking. Some embodiments regard n-dimensional (nD) auto grouping of spatially voted points.

An advantage of embodiments can include detecting and tracking (e.g., in real time or near real time) an aerial entity (e.g., an Unmanned Aerial System (UAS)), a watercraft (e.g., a ship, submarine, missile, or the like), a ground craft (e.g., a car, truck, all terrain vehicle, bicycle, Segway, or the like), a biological entity (e.g., a bird, person, water animal, ground animal, underground animal, or the like), a plane or other aerial object, or other object. Embodiments can leverage spatially voted data features to differentiate man-made objects from clutter or biological objects. The features can include azimuth, elevation, range, longitude, latitude, elevation, zone, or the like. Embodiments can generalize two dimensional (2D) Spatial Voting (SV) into a generalized form enabling 3D (or other higher-dimensional) Adaptive Auto-Grouping (AAG) across multiple input cycles. Embodiments can provide enhanced spatial volume technique performance over incumbent radar data processing (RDP), such as a proposed Mean Shift Algorithm (MSA) (e.g., for reducing number of false object tracks).

To date, no such technology exists. To date, other object tracking uses Radar Data Processing (RDP) and a Tracker (TRK) based on traditional multi-stage processing of received signals. These processors can sense Constant False Alarm Rate (CFAR) signal thresholding to produce "detections" or "CFAR hits". The detections are then associated and clustered to determine the centroid of CFAR hit distributions. Association of multiple CFAR hit distributions are then tracked across multiple scans to produce a "track". A heuristic for track association is then performed. Kalman filtering is then performed to smooth positional estimates. This technique is sensitive to parameters to optimize performance, thus making it subject to the No Free Lunch Theorem.

A technique to enhance RDP object track performance can include using MSA. MSA is commonly used in image processing, for iteratively converging CFAR hits into clusters without requiring a priori specification of how many clusters are presumed to exist. This is a well-understood robust technique. MSA provides an alternative to k-means clustering since it is stochastic in nature and converges to unique solutions. MSA, however, is computationally intensive and does not scale well with large numbers of points (it is $O(Dn^2)$ in computational operations required, and therefore non-scaling).

Fukunaga, Keinosuke; Larry D. Hostetler (January 1975). "The Estimation of the Gradient of a Density Function, with Applications in Pattern Recognition". IEEE Transactions on Information Theory. 21 (1): 32:40 describe MSA use for association and clustering of detections or CFAR hits. Fukunaga et al. consider a set of points in two-dimensional space. They assume a circular window centered at C and having radius, r, as a kernel. MSA is a "hill climbing" technique, that includes shifting this kernel iteratively to a higher density region until convergence. Every shift is defined by a mean shift vector. The mean shift vector always points toward the direction of the maximum increase in the density. At every iteration, the kernel is shifted to the centroid or the mean of the points within it. The method of calculating this mean depends on the choice of the kernel. If a Gaussian kernel is chosen instead of a flat kernel, then every point will first be assigned a weight, which will decay exponentially as the distance from the kernel's center increases. At convergence, there will be no direction at which a shift can accommodate more points inside the kernel.

MSA can be used for tracking of plots/targets. MSA can be used for visual tracking. Such use can include creating a confidence map in a new image based on a color histogram of the object in the previous image. MSA can be used to find the peak of a confidence map near a position of the object in the previous image. The confidence map is a probability density function on the new image, assigning each pixel of the new image a probability, which is the probability of the pixel color occurring in the object in the previous image. A few algorithms, such as kernel-based object tracking, ensemble tracking, expand on this idea.

MSA is an application-independent tool suitable for real data analysis. MSA does not assume any predefined shape on data clusters. MSA is capable of handling arbitrary feature spaces. The MSA procedure relies on choice of a single parameter, namely bandwidth. The bandwidth/window size 'h', has a physical meaning, unlike k-means clustering. However, using MSA, the selection of a window size is not trivial. In MSA an inappropriate window size can cause modes to be merged, or generate additional "shallow" modes. Further, MSA often requires using an adaptive window size. As previously discussed, computational complexity of the MSA technique is O(Dn^2), where D=dimensions and n=number of data points, thus making MSA not very scalable. Further yet, using MSA, there is no guarantee of centroid convergence depending on kernel choice, so arbitrary stopping is imposed in practice, making its performance limited by the No Free Lunch Theorem.

Embodiments provide a superior technique to nD object tracking. Embodiments are sometimes referred to as SVAAAG (SV Agile Adaptive Auto Grouping). Embodiments can overcome one or more of the aforementioned limitations of the 2D implementation by providing support for arbitrary, n, dimensions ("nD"). Embodiments can include allowing groups created using adaptive auto grouping (AAG) methods to persist across input cycles (e.g., radar scans). In embodiments, each group represents an object, and the points mapped to the group represent the object track. Adding an input to a group is track association and object track updating.

Not allowing groups to persist across radar scans limits a total maximum number of objects that came into existence. Embodiments can maintain an adaptive stack of 2D grids in computational memory. This negates the need to make heuristic rules fir object assignment to individual SV grids. This can be accomplished using a "grid-0" for initialization (sometimes called a buffer grid) on which groups are formed and tested for sufficient persistence (e.g., number of CFAR hits per n-scans) to be declared a true object. If declared a true object, the group can be moved to an object number-indexed SV grid to enable future CFAR hit association. Embodiments can include an SV grid to represent "ground clutter" (sometimes called a stationary or background grid) and to enable capture of all CFAR hits over multiple radar scans.

Figure 7:
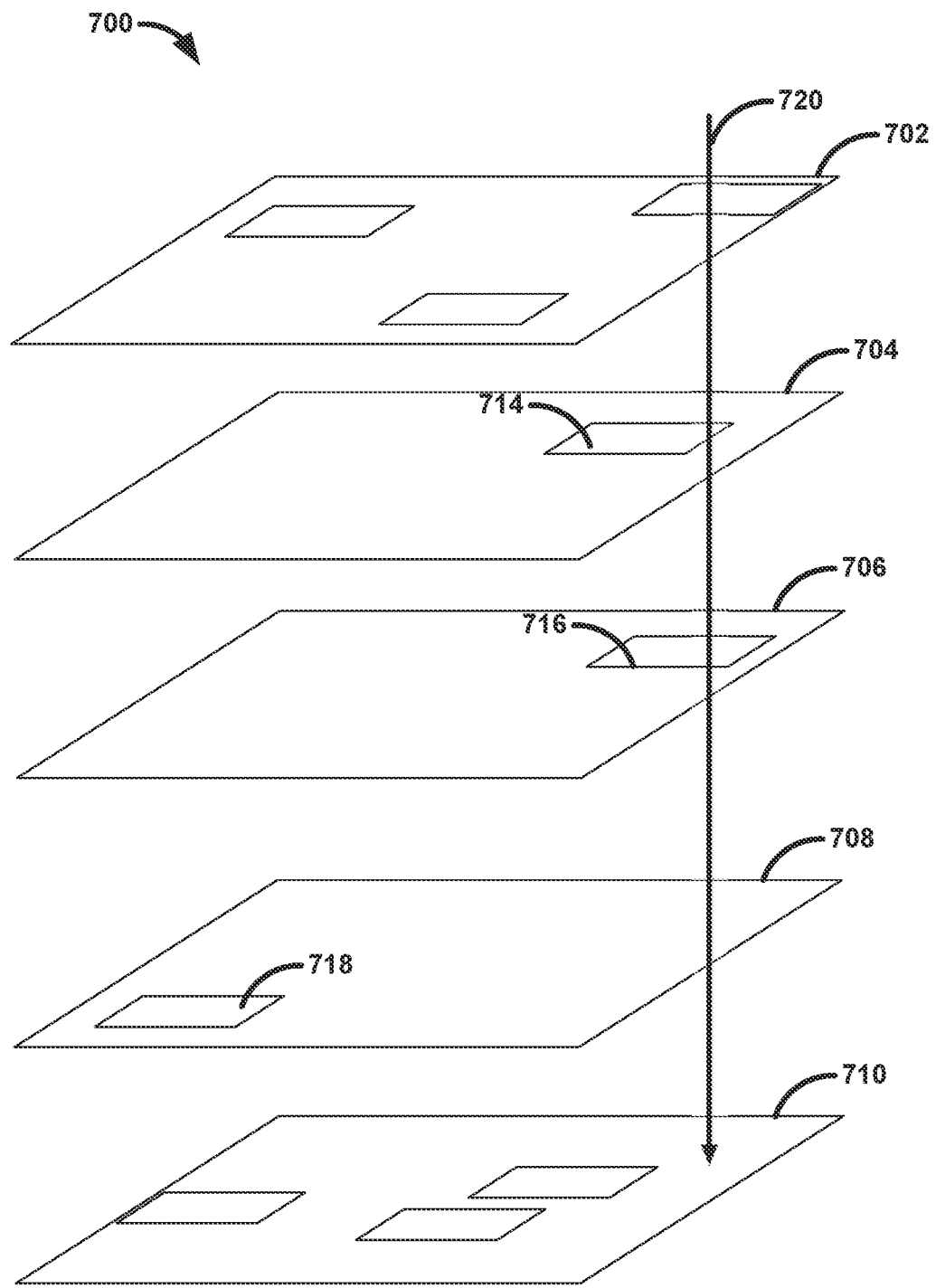
FIG. 7 illustrates, by way of example, a diagram of an embodiment of a system of SV grids, such as can be used for object tracking.

Embodiments can include processing a new CFAR hit through a buffer layer, one or more object layers, and a stationary layer (see FIG. 7). Embodiments can include creating new groups or updating existing groups as a function of an input indicating a detection (e.g., a CFAR or other object hit location). For example, if a CFAR hit is inside an existing group extent, a hit counter of the object can be updated and a run length encoding (RLE) defining populated extent can be updated (if required). Conversely, if a CFAR hit is outside the extent, a new group center and extent can be declared. Embodiments can include, testing all CFAR hits against existing object extents. For example, if a CFAR hit falls inside a pre-existing extent, an object centroid can be recalculated (e.g., with even weight on the new point). If (and only if) the updated centroid falls outside the boundary of the current center grid cell, the entire object moved towards (e.g., halfway towards) a new CFAR hit. This enables object motion with inertia or damping, such as to reduce or eliminate motion jitter.

Embodiments can include updating the stationary layer where clutter is assigned. This enables the provision of a "heat map" of RGB values to visually display regions and magnitude of clutter. A user roll up display can be configured to show only valid tracked object layers to be displayed so the clutter does not show up unless requested.

To overcome an execution slowdown from too many persisting SV grids, rules can be added limiting the number of objects to objects that have moved within a specified period of time. If an object is not updated enough, or does not move enough, it can be removed and points within the object extent can be moved to the stationary SV grid. This frees up object numbers and limits a total object count and number of SV grid dynamically to reduce computational burden.

Embodiments can use a 2D SV grid as a 1D sequence of grid values and extend the grid into nD. Embodiments can accomplish this by performing a single 1D index sequence raster scan that an entire nD SV grid space.

Embodiments provide a generalization to nD hyper-volumetric space representation with single Run Length Encoded (RLE) string parse and update per object. Embodiments can consider AAG groups as respective objects and track the groups across epochs or scans. Embodiments can provide autonomous segmentation of tracked objects (e.g., airplanes, drones, birds, weather patterns, or the like) from stationary, ground clutter, other targets, or environmental phenomena. Embodiments can provide a fusion of a data feature set (e.g., Doppler spectrum, signal to noise ratio (SNR), polarization, or the like) features in an efficient manner. Embodiments provide a less memory intensive and compute bandwidth intensive solution to prior AAG solutions.

The following description and the drawings sufficiently illustrate specific embodiments to enable those skilled in the art to practice them. Other embodiments may incorporate structural, logical, electrical, process, and other changes. Portions and features of sonic embodiments may be included in, or substituted for, those of other embodiments. Embodiments set forth in the claims encompass all available equivalents of those claims.

FIG. 1 illustrates, by way of example, a diagram of an embodiment of a system 100 for spatial voting. The system 100 as illustrated includes processing circuitry 104 and a memory 116. The processing circuitry 104 can map the input 102 to an SV grid and determine an object track 118 based on the mapping. The mapping can perform an object track association or object track update. The memory 116 can store key values, SV grid parameters, or other data input or output from the processing circuitry 104.

The processing circuitry 104 receives input 102. The input 102 can include data indicating a detection of an object, such as by a CFAR hit, a sonar hit, a ground sensor hit, or the like. The input 102 can include binary data, text, signal values, image values, or other data that can be transformed to a number. The processing circuitry 104 can transform the input 102 to a number, at operation 108. The operation 108 can include encoding the input into a specified format, parsing the data into chunks (e.g., chunks of a specified size), or the like. For example, the operation 108 can include encoding text input to an American Standard Code for Information Interchange (ASCII) encoding to transform the input 102 into numbers between zero (0) and two hundred fifty five (255). In another example, the operation 108 can include converting chunks of binary data to their numerical equivalent, such as two's complement, unsigned integer, floating number (e.g., short or long), or the like. In yet another example, the operation 108 can include performing an analog to digital conversion on analog signal data, such as by an analog to digital converter. In yet another example, the operation 108 can include combining azimuth (Az), elevation (El), or range (Rng) values of a CFAR hit, to generate a number. Not all input 102 needs to be transformed, thus the operation 108 is optional.

The processing circuitry 104 can receive numbers either as raw input 102 or from the operation 108 and encode the numbers into an nD feature space (discussed below) at operation 110.

The features can be plotted against each other on a grid (2D grid, 3D grid (e.g., cuboid) or other higher-dimensional grid of cells), at operation 112. The processing circuitry 104 can initialize an SV grid to which the encoded inputs are mapped, such as at operation 112.

Plotted values can be associated or correlated, such as at operation 114. The operation 114 can include turning groups of mapped inputs, determining a center of the group, and determining an extent of the group. More details regarding the operations 108-114 are provided elsewhere herein.

Examples of features include RM (similar to a running mean), RS (similar to a running standard deviation), SM, SS, TM, TS, OC1, OC2, and OCR (discussed below), as well as raw data. These calculations are performed in the sequence shown so that they can be calculated in a single pass across the data element where a value derived by an earlier step is used in an antecedent step directly and all calculations are updated within a single loop. RM can be determined using Equation 1:

$$RM_i = (RM_{i-1} + X_i)/2 \qquad \text{Equation 1}$$

In Equation 1, $X_i$ is the ith input value for $i = 1, 2, \ldots n$.

RS can be determined using Equation 2:

$$RS_i = \left( RS_{i-1} + \sqrt{\frac{(X_i - RM_i)^2}{2}} \right)/2 \qquad \text{Equation 2}$$

SM can be determined using Equation 3:

$$SM_i = \Sigma X_i/n \qquad \text{Equation 3}$$

SS can be determined using Equation 4:

$$SS_i = \sqrt{(SS_{i-1} + (X_i - SM_i)^2)/(n-1)} \qquad \text{Equation 4}$$

TM can be determined using Equation 5:

$$TM_i = (TM_{i-1} + SM_{i-1})/2 \qquad \text{Equation 5}$$

TS can be determined using Equation 6:

$$TS_i = \left( TS_{i-1} + \sqrt{\frac{(X_i - TM_i)^2}{2}} \right)/2 \qquad \text{Equation 6}$$

Orthogonal component 1 (OC1) can be determined using Equation 7:

$$OC1_i = (RM_i + SM_i + TM_i)/3 \qquad \text{Equation 7}$$

Orthogonal component 2 (OC2) can be determined using Equation 8:

$$OC2_i = (RS_i + SS_i + TS_i)/3 \qquad \text{Equation 8}$$

Orthogonal component rollup (OCR) can be determined using Equation 9:

$$OCR_i = OC1_i + OC2_i \qquad \text{Equation 9}$$

There is no "best" encoding for all use cases (Ugly Duckling Theorem limitation). Each set of encoding features used as (x, y) pairs will yield a different but valid view of the same data, with each sensitive to a different aspect of the same data. "R" features tend to group and pull together, "S" features tend to spread out, "T" features tend to congeal data into fewer groups but sub groups tend to manifest with much more organized structure, and "OC" features tend to produce the most general spread of data. "OC" features most resemble PC1 and PC2 of traditional Principal Component Analysis (PCA) without the linear algebra for eigenvectors.

Each feature is now described in more detail with suggested application:

R-type feature—Associates data into closer, less spread groups, guaranteed to be bounded in SV data space if the encoding is bounded and the SV space is similarly bounded (e.g., if ASCII encoding is used and the x and y extent are bounded from [000]-[255]). R-type features are recommended when the dynamic variability in data is unknown (typically initial analysis). This can be refined in subsequent analysis. R-type features will tend to group data more than other features.

S-type feature—Tends to spread the data out more. Flow the encoded data spreads can be important, so things that stay together after spreading are more likely to really be similar. S-type features produce a potentially unbounded space. S-type features tend to spread data along one spatial grid axis more than another. Note, if the occupied cells in the SV spatial grid fall along a 45-degree line, then the 2 chosen stat types are highly correlated and are describing the same aspects of the data. When this occurs, it is generally suggested that one of the compressive encoding features be changed to a different one, T-type feature—These compressive encoding features are sensitive to all changes, and are used to calculate running mean and running sigma exceedances. T-type features can provide improved group spreading over other features types. T-type features tend to spread data along both axes.

OC-type feature—Orthogonal Components, which are simple fast approximations to PCA (Principal Component Analysis). The OC1 component is the average of RM, SM, and TM, OC2 is the average of RS, SS, and TS, and OCR is the sum of OC1 and OC2.

Note that while two variants of each type of feature are provided (e.g., RS and RM are each a variant of an R-type feature) cross-variants can provide a useful analysis of data items. For example, if an RS or RM is used as feature 1, any of the S-type features, T-type features, or OC-type features can also be used as feature 2. Further, two of the same feature can be used on different data. For example, TS on a subset of columns of data from a row in a comma separated values (CSV) data file can form a feature 1, while TS on the same row of data but using a different subset of columns can form a feature 2.

In some embodiments, one or more features can be determined based on length of a corresponding data item. The length-based features are sometimes called LRM, LRS, LSM, LSS, etc.

The features of Equations 1-9 are order-dependent.

The SV grid parameters can be adjusted by the processing circuitry 104. An initial size of an SV grid cell can be determined. In some embodiments, the initial size of the SV grid cell can be based on the Rng to the object corresponding to the SV grid (discussed elsewhere herein).

As either the number of SV grid cells on a side or the overall extent of the SV grid in x and y are increased to encompass new input data items, the SV grid column (Equation 14), SV grid row (Equation 15), and key index value (Equation 16) can be changed to map the populated SV grid cells from the previous SV grid to the newly size one. To accomplish this, the center (x, y) value of each populated SV grid cell can be calculated using the minimum and maximum x and y values and the number of SV grid cells in the previous SV grid, and then mapping the centers and their associated SV grid counts onto the new SV grid using Equations 14, 15, and 16. This is done using the following equations:

$$\text{Row}=\text{int}(\text{Key Value}/(\text{number of cells on side})) \quad \text{Equation 10}$$

$$\text{Col}=\text{Key Value}-\text{int}(\text{Row}*(\text{number of cells on side})) \quad \text{Equation 11}$$

$$\text{Center } 1=x \text{ min}+\text{Col}*(x \text{ range})/(\text{num. col}-1) \quad \text{Equation 12}$$

$$\text{Center } 2=y \text{ min}+\text{Row}*(y \text{ range})/(\text{num. row}-1) \quad \text{Equation 13}$$

The values for Center 1 and Center 2 can then be used in Equations 14, 15, and 16 (below) as Feature 1 and Feature 2 to calculate the new Key Value for each populated cell on the new SV grid.

Figure 2:
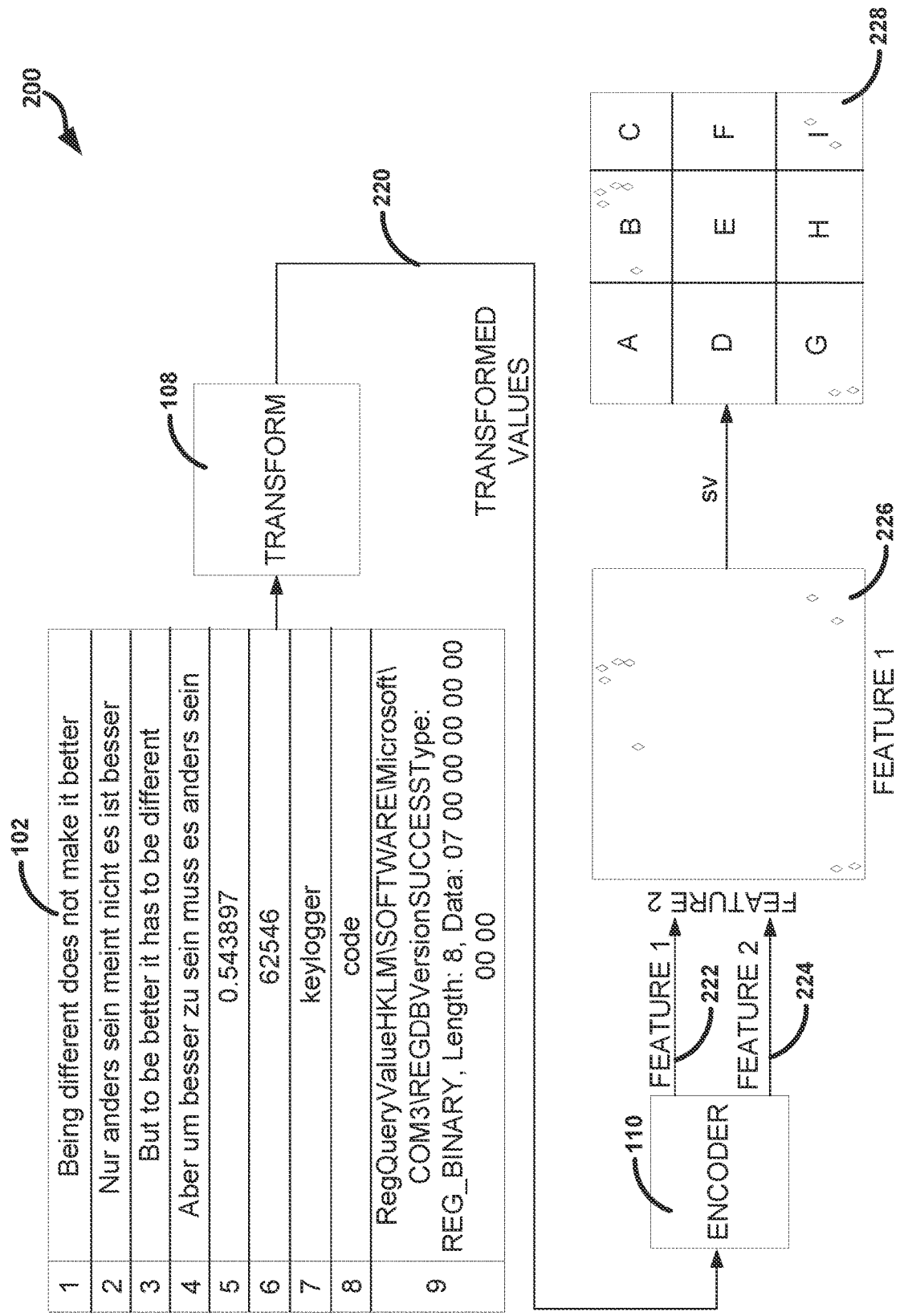
FIG. 2 illustrates, by way of example, a diagram of an embodiment of a method for spatial voting.

FIG. 2 illustrates, by way of example, a diagram of an embodiment of a method 200 for spatial voting. The method 200 as illustrated includes receiving the input 102. The input 102 in FIG. 2 includes nine text strings labelled "1"-"9". This is merely an example, and the input 102, for purposes of object tracking, can include Az, El, Rng, latitude (Lat), longitude (Long), or the like. Each of the text strings "1"-"9" of the input 102 is respectively transformed to transformed values 220 at operation 108. An example transformation is ASCII encoding which transforms text to numerical values. The transformed values 220 can be used to perform the operation 110. The operation 110 can include determining two features 222, 224 of the input 102 and plotting them against each other to form a feature graph 226. The features 222, 224 can include, for example, raw values, RM, RS, SM, SS, TM, and TS, in some embodiments.

Consider the input data item "1". Each character of the input data item "1" can be transformed to an ASCII value. The features can be determined based on the ASCII encoding of the entire string. That is, $X_i$ is the ASCII value of each character and the features are determined over all ASCII encodings of the characters of the input data item "1". As an example, the resultant RM can be feature 1 222 and the resultant RS can be feature 2 224, or vice versa. This is merely an example and any order-dependent feature can be chosen for feature 1 and any order-dependent feature chosen for feature 2. Each of the input data items "1"-"9" can be processed in this manner at operation 108 and 110.

The graph 226 can then be split into cells to form a grid of cells 228. The cells of FIG. 2 are labelled "A"-"I" for illustration (we will introduce Key Values to numerically label the SV grid cells in Equation 16). Inputs 102 mapped to a same cell can be considered similar. Inputs 102 mapped to an empty cell can be considered anomalous. In the grid of cells 228, input data items "1"-"4" (sentences in English and German) are mapped to cell "B", input data items 5-6 (numbers) are mapped to cell "I", and input data items "7-8" (words) are mapped to cell "G". Input data item 9, which is a combination of words, numbers, and other characters, maps to cell "B" indicating that input data item "9" is more like a sentence than a word or number. If a subsequent input 102 were to be received and mapped to cell "A", "C", "D", "E", "F", or "H" it can be processed according to techniques described.

Figure 3:
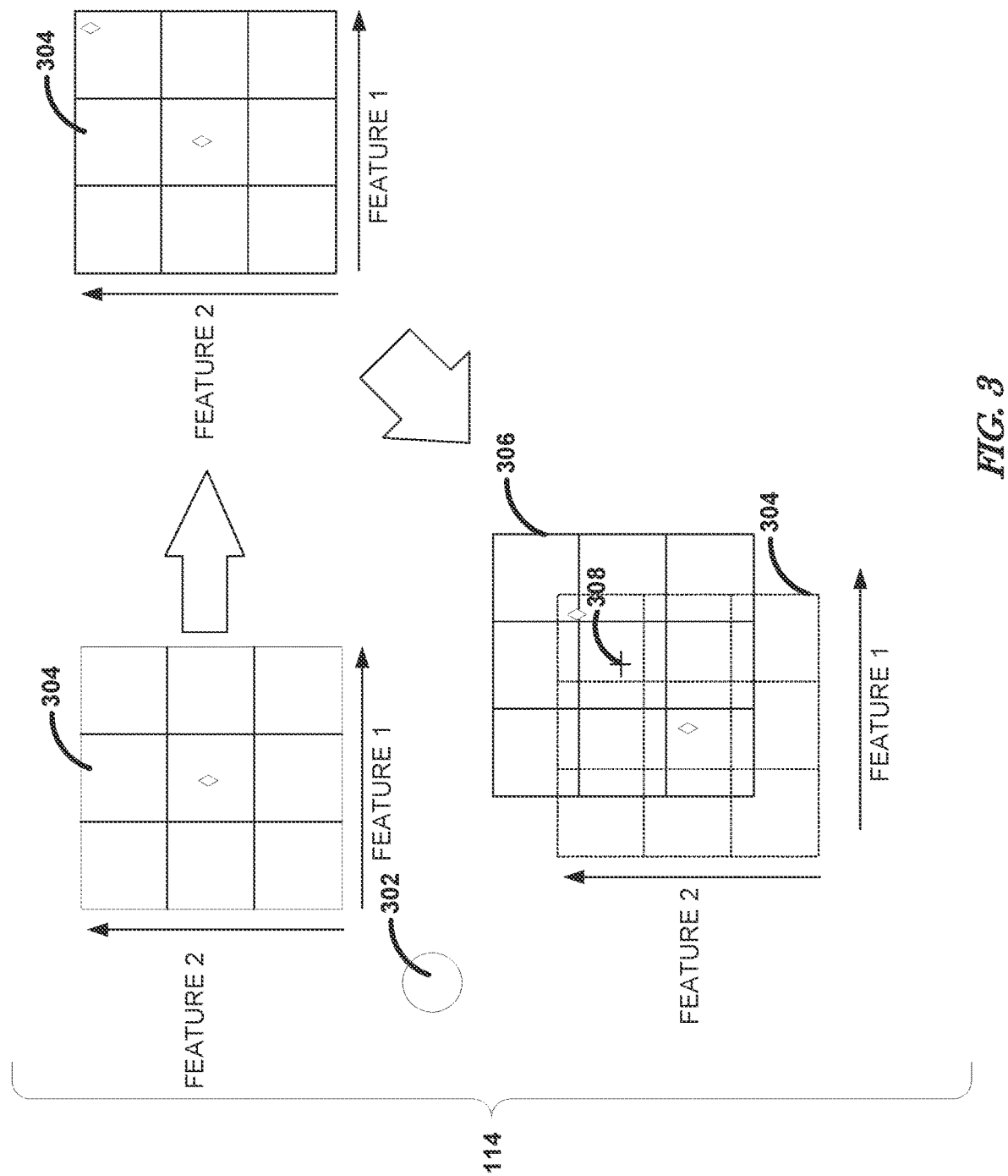
FIG. 3 illustrates, by way of example, a diagram of an embodiment of a portion of a grouping operation.

FIG. 3 illustrates, by way of example, a diagram of an embodiment of the operation 114. The operation 114 is described using a two-dimensional example and later using a three-dimensional example. However, the operation 114 can be generalized to nD.

Using the operation 114, a maximum extent of the SV grid is not defined a priori. Using the operation 114, only portions of the SV grid that include an input mapped thereto can be defined. If an input is mapped to a portion of the SV grid that has not yet been defined, a new portion of the SV grid can be defined to accommodate the input.

An origin 302 can be chosen and defined. A size of a cell (e.g., extent in feature 1 direction and extent in feature 2 direction), a number of rows of cells, and a number of columns of cells in a group can be defined. The origin 302 can be defined at a point to which an input cannot be mapped. For example, if feature 1 is strictly a positive number, the origin can be defined at a negative value for feature 1. The origin 302 provides a relative location from which the remainder of the SV grid can be defined or determined.

An input can then be received and processed, such as by performing operations 108, 110, and 112 (see FIG. 1). The cell to which the first input is mapped on the SV grid is defined as a center of a first group of cells 304 (sometimes called an object) which can have an odd number of rows and an odd number of columns (the number of rows and columns may or may not be equal), otherwise the first point would not represent the true center of the group and its extent. It can be preferred to define the SV grid for a group of cells 304 so that the SV grid is symmetric in feature 1 and in feature 2 in terms of the number of cells in each axis, although the extent or size of each cell in feature 1 and in feature 2 do not necessarily have to be the equal. The cell of the group of cells 304 to which the first input mapping into the group is defined as the center cell for the group of cells 304. The number of rows of cells can be the same or different as the number of columns of cells. Each subsequent group can include the same size (same cell extent and number of cells) as an initial number of cells of the group of cells 304, although this is not a required condition. As will be discussed later, a group of cells that is farther away from a device performing detection (e.g., a radar or the like) can have more (e.g., smaller) cells than a group of cells that is closer to the device performing the detection.

A next input can be received and processed, such as by performing operations 108, 110, and 112 (see FIG. 1). If the input is mapped to a cell of the first group of cells 304, no additional cells are defined. The group of cells 304 can be associated with a group number (e.g., a positive integer). The first group formed can be assigned group number 1, the second group formed can be assigned group number 2, and so on. Other numbering conventions are possible.

A new center 308 of the group of cells can be determined. The new center 308 can be determined using the RM statistic, or other statistic. Using the RIM statistic, the previous center and the next input can be averaged to determine the new center 308. If more than one point is mapped to the group of cells 304 and a next point is received, the RM statistic of all points mapped to the group of cells 304 can be used to determine a new center for the group of cells 304. The entire SV grid representing the group of cells 304 can be shifted to the new center 308 to generate an updated SV grid 306 representing the group of cells (if (and only if) the new center 308 is outside a center cell of the group of cells 304). This movement of the SV grid of cells 304 allow an object to be tracked, such as when the features being spatially voted are related to location.

Figure 4:
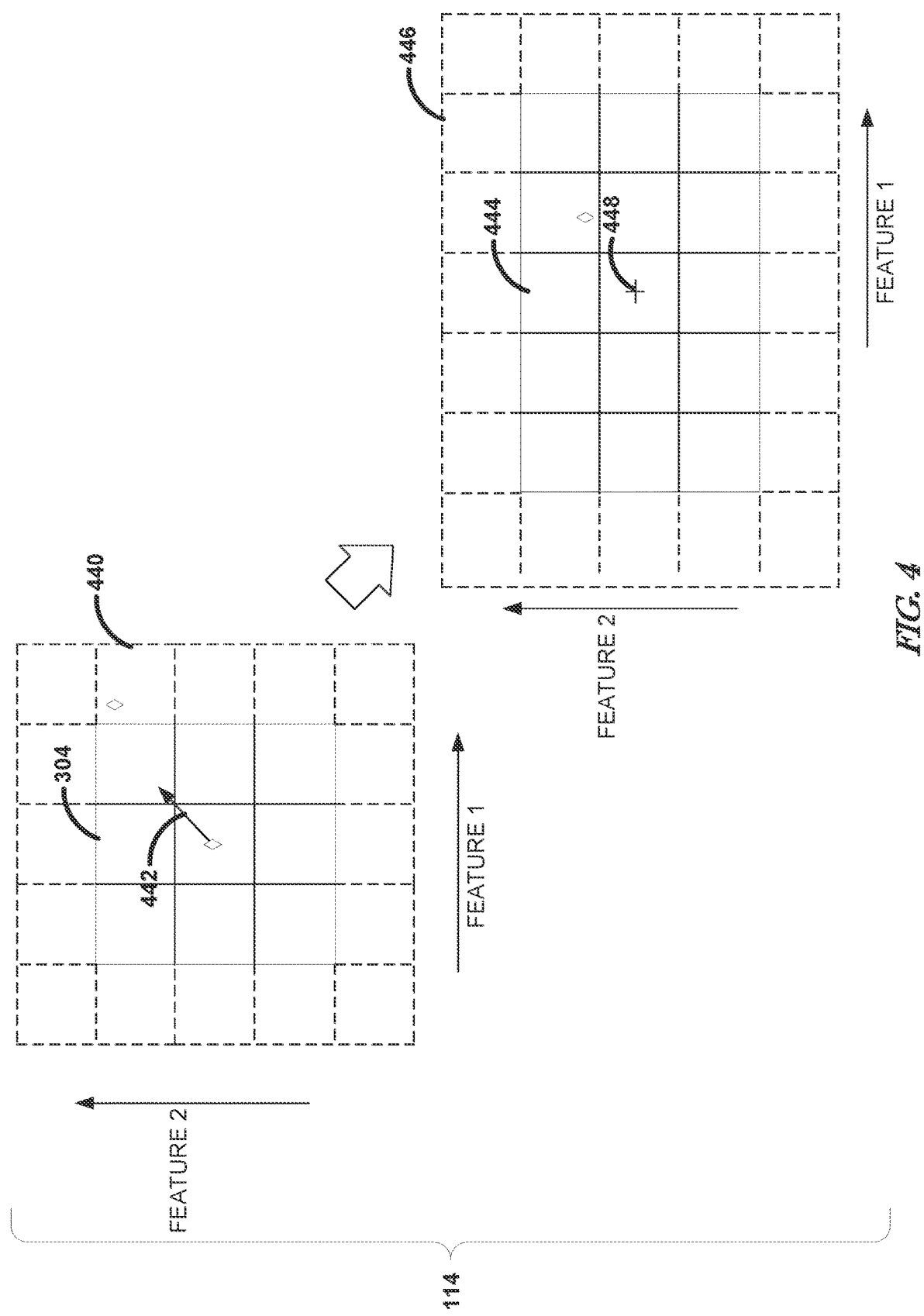
FIG. 4 illustrates, by way of example, a flow diagram of an embodiment of a portion of a grouping operation.

In the example of FIG. 3, the next input is mapped within the SV grid of cells 304. FIG. 4 explains operations that can be performed when the next input is mapped outside the SV grid, but near the SV grid.

FIG. 4 illustrates, by way of example, a flow diagram of an embodiment of a portion of the operation 114. The SV grid of cells 304 has a defined extent indicated by the solid lines in FIG. 4. The SV grid of cells 304 further has a defined virtual extent 440, indicated by the dashed lines in FIG. 4. In the example of FIG. 4, the virtual extent is one cell length outward from the perimeter of the SV grid of cells 304.

If the next input is mapped to a location outside an extent of the SV grid of cells 304, but within the virtual extent 440, the next input can be considered part of the group and the center can be updated as described regarding FIG. 3 and as indicated by arrow 442. If the next input is mapped to a location outside an extent of the SV grid of cells 304, but within the virtual extent 440, the extent of the SV grid of cells 304 can be changed and the virtual extent 440 can likewise be changed.

An SV grid 444 illustrates a new extent of the SV grid of cells 304. A virtual extent 446 illustrates a new virtual extent of the SV grid 444. A new center 448 is also illustrated.

The new extent of the SV grid of cells 304 can include an even number of rows or columns of cells added to the SV grid of cells 304. In the example of FIG. 4, the SV grid 444 includes two more columns than the SV grid of cells 304. In the example of FIG. 4 the extent of the SV grid 444 extends one column immediately to the left, and one column immediately to the right of the SV grid of cells 304. The SV grid 444 includes the SV grid of cells 304 with the additional columns and the center shifted. The virtual extent 446 can be larger than the virtual extent 440, to accommodate the additional cells in the SV grid 444. The virtual extent 446, in the example of FIG. 4 extends one cell in all directions outward from a perimeter of the SV grid 444.

In the example illustrated in FIG. 4, the new input is received to the right of the SV grid of cells 304, but within the virtual extent 440. If the new input was received above or below the SV grid of cells 304, but within the virtual extent 440, the SV grid of cells 304 can be extended one row immediately above and one row immediately below the SV grid of cells 304. If the new input was received both above or below and left or right of the SV grid, but within the virtual extent 440, the group of cells 304 can be extended to occupy the virtual extent 440.

In some embodiments, in response to receiving a new input that lies within the virtual extent 440 but outside the extent of the SV grid of cells 304, instead of extending the SV grid of cells 304 to include more columns, the SV grid can be extended one or more cells in all directions (regardless of whether the input is left, right, above, or below the SV grid of cells 304. In any case, the virtual extent 440 can be updated to occupy a different space than it currently does.

Figure 5:
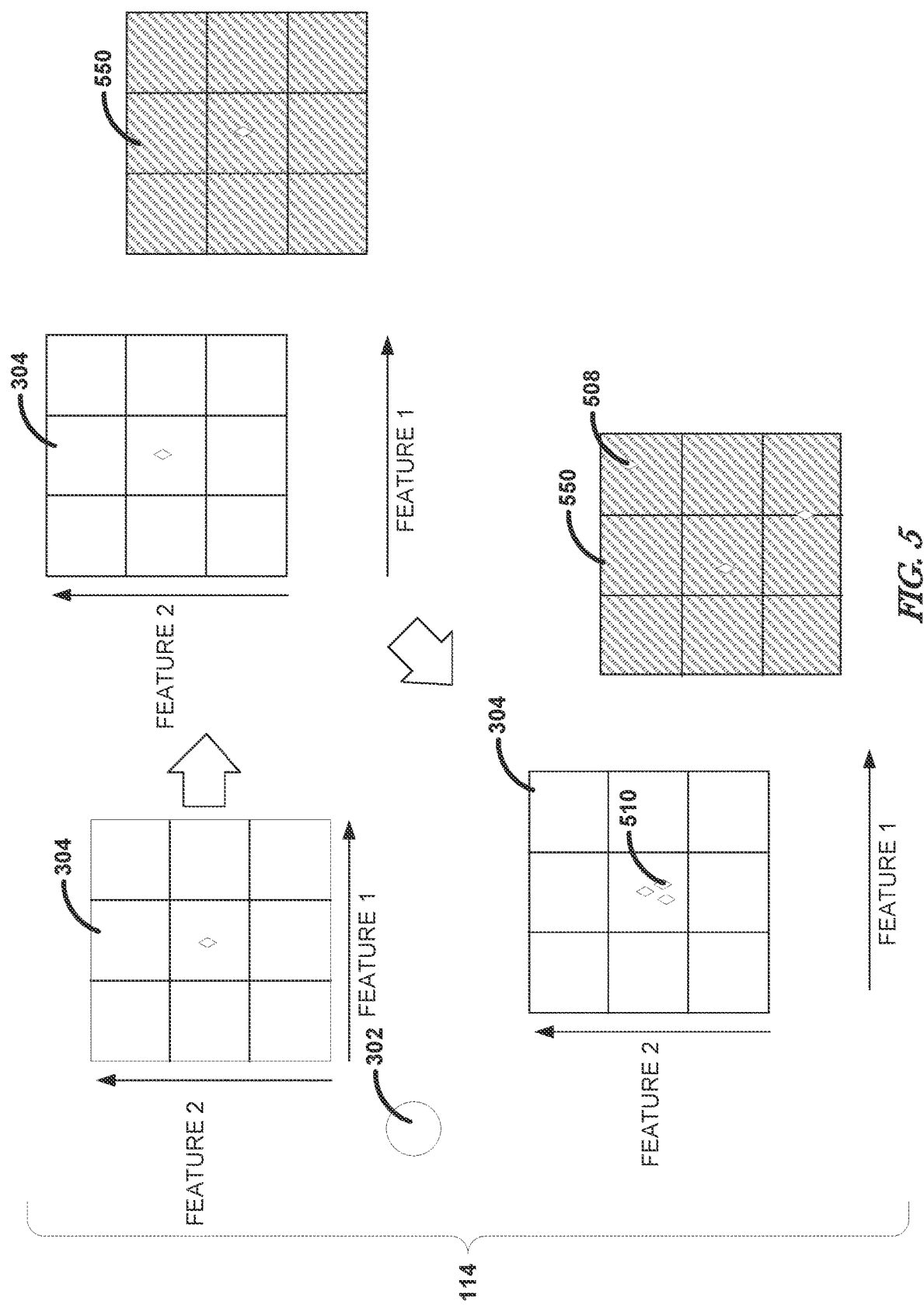
FIG. 5 illustrates, by way of example, a diagram of an embodiment of a portion of a grouping operation.

FIG. 5 illustrates, by way of example, a diagram of an embodiment of a portion of the operation 114. If the next input is mapped to a location outside an extent of the group of cells 304 (and outside a virtual extent 440), a new group of cells 550 can be defined (as anew object). The cell to which the next input is mapped on the SV grid can be defined as a center cell of the next group of cells 550. The group of cells 550 can have an odd number of rows and an odd number of columns. The group of cells 550 can include a same or different number of rows, columns, and cells as the group of cells 304. A group number associated with the next group of cells 550 can be incremented by one from the group number associated with the immediately preceding group of cells.

Subsequent inputs can be mapped to the SV grid that is defined by the groups of cells. Such inputs can be deemed to represent an object being tracked that is represented by the group. Examples of additional inputs mapped to the groups of cells 304, 550 are illustrated in FIG. 5 at points 510 and 508, for example. Note how the SV grid representing the group of cells 550 has moved relative to the group of cells 304 with new inputs.

Figure 6:
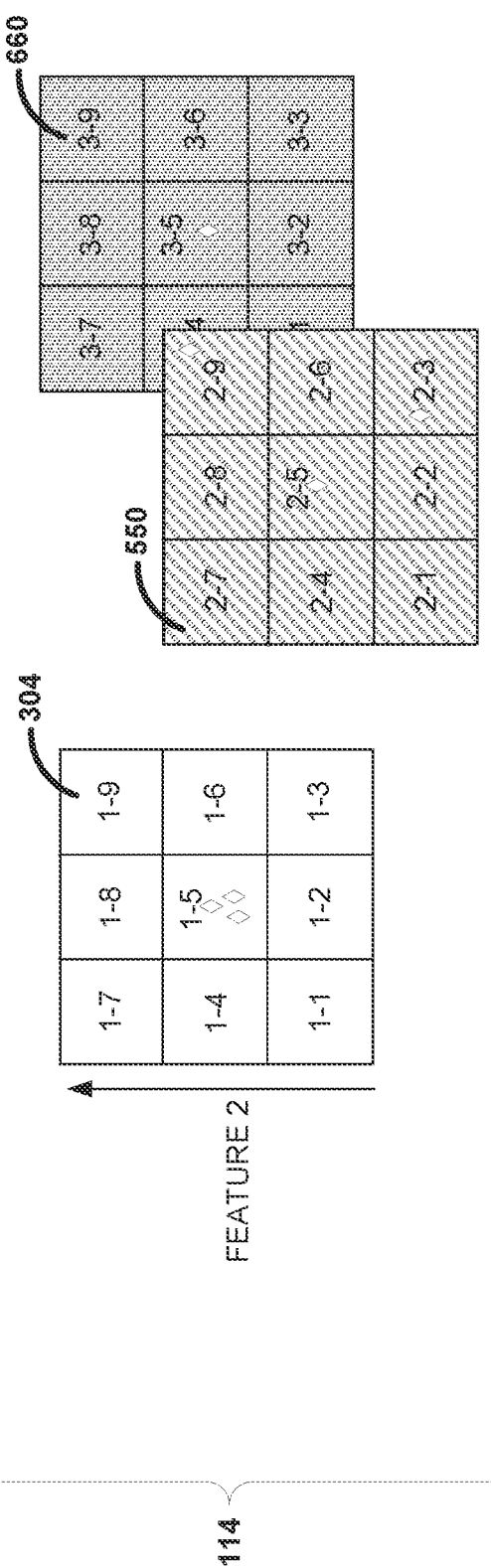
FIG. 6 illustrates, by way of example, a diagram of an embodiment of a portion of a grouping operation.

FIG. 6 illustrates, by way of example, a diagram of an embodiment of a portion of the operation 114. FIG. 6 illustrates the groups of cells from. FIG. 5 after a new group of cells 660 has been formed based on an additional new input. The extent of the groups 550, 660 overlap. This is possible for a few reasons. First, the discussion so far provides examples in two-dimensions, while the objects represented by the groups of cells 304, 550, 660 move in three-dimensional space. Thus, one dimension of the space is "folded" into the 2D space of the SV grids or is simply ignored. Second, the groups of cells 304, 550, 660 can move (such as by updating the center or extent of the groups of cells as described regarding at least FIGS. 3, 4, and 5, A consequence of the overlapping groups of cells 304, 550, 660, includes the possibility of a new input mapping two or more of the groups of cells 304, 550, 660. Consider an input mapped to the cell labelled "2-9" in FIG. 6. That input would be mapped to the group of cells 550, Also, that input would either be in the extent or virtual extent of the group of cells 660, and thus would be mapped to the group of cells 660 as well. In some embodiments, it is desired to determine which of the groups 550, 660 the input is actually a part of To determine this, more data can be spatially voted to distinguish the input into one of the groups 550, 660. This process is sometimes called deconflicting and is described in more detail regarding FIG. 11.

The key values for the first group of cells 304 are illustrated at 1-1, 1-2, 1-3, . . . ,1-9. The key values for the second group of cells 550 are similarly 2-1, 2-2, 2-3, . . . , 2-9. The key values for the third group are similarly 3-1, 3-2, . . . , 3-9. The labelling of the key values is arbitrary, but labelling them as [group, cell] as in FIG. 6 can help save memory space over alternative labels.

An alternative labelling that is just as efficient as the one illustrated in FIG. 6 can include labelling the cells in numeric order regardless of position in the group. This labelling scheme would change "3-2" to "3-1", "3-3" to "3-2", "3-5" to "3-3" and so on, Note that while cells are numbered in increasing order from left to right and bottom to top, another numbering scheme can be used, such as increasing from top to bottom, increasing from right to left, a combination thereof, or the like.

The SV grid of FIG. 6 can be defined as:
[origin, cell extent, number of cells in group 1, group 1 center, number of cells in group 2, group 2 center, number of cells in group 3, group 3 center] where the origin is the relative location to which other points in the SV grid are defined, the cell extent indicates the distance in all feature directions a cell occupies, the number of cells in the group indicates a number of rows and columns of cells for each group, and group 1 center, group 2 center, and group 3 center indicate the center cell from which the remainder of the group can be inferred by the cell extent and number of cells in the group.

FIG. 7 illustrates, by way of example, a diagram of an embodiment of a system of SV grids 700, such as can be used for object tracking. The SV grids 700 include a buffer grid 702, object grids 704, 706, 708 for each currently active object, and a stationary grid 710 (sometimes called "background grid").

The buffer grid 702 stores mapped inputs that are not yet part of an object. Requirements to generate an object can be heuristic-based (e.g., a physics-based process for example). For example, to generate a group a threshold number of inputs can be mapped to a group of cells within a specified period of time. In terms of object tracking, a group can be formed if a threshold number of inputs are mapped to a group extent within a specified number of radar scans. The groups of cells (objects) can be numbered in order of appearance. Embodiments replace a Kalman filter that is typically used to perform the track update and track association with forming and updating the groups.

In the example of FIG. 7, the SV grid 704 represents a fist object detected (and still persisting), the SV grid 706 represents a second object detected (and still persisting), and the SV grid 708 represents an Nth object detected (and still persisting), Conditions for persistence of the object can be defined to be same as, or different from, group formation. That is, to remain an object that is being tracked, a threshold number of inputs are mapped to the group extent within a specified period of time or number of radar scans. In some embodiments, a motion requirement can be included in the heuristic. For example, points mapped to within a threshold distance (on the SV grid) of a previous point can be considered a same point (within an error of the voting process). Points mapped to the group of cells, but more than the threshold distance apart can be considered moving. This heuristic can be used for persistence, group formation, or both.

If an object is determined to be non-moving, or to not be receiving inputs within its extent (or virtual extent) for a specified period of time, the object can be removed (deleted from memory). To remove the object, the entire SV grid representing the object can be removed. The remaining SV grids can be renumbered accordingly. The points of the object (if not already on the stationary SV grid 710) can be added to the stationary SV grid 710. The stationay SV grid 710 includes all inputs mapped thereto (with or without inputs mapped to the groups of cells 714, 716, 718) in the SV grids 704, 706, 708. The stationary SV grid 710 is useful for building a map of ground clutter, such as to distinguish it from a moving object. The stationary SV grid 710 provides an ability to discriminate between ground clutter and moving objects.

A line 720 represents an input being mapped to each of the SV grids 702, 704, 706, 708, 710. Any of the groups of cells 714, 716, 718 to which the input is mapped can be updated with a new center and a new extent (if warranted). In the Example of FIG. 7, the input represented by the line 720 is mapped to the groups of cells 704 and 706, and can be mapped to the SV grid 710.

So far, the discussion of object tracking using SV grids regards 2D SV grids. In these examples, Az and El (raw or one or more statistics determined based thereon) can be plotted on an SV grid. The solutions discussed herein are not limited to such 2D extents and can be generalized to nD.

Figure 8:
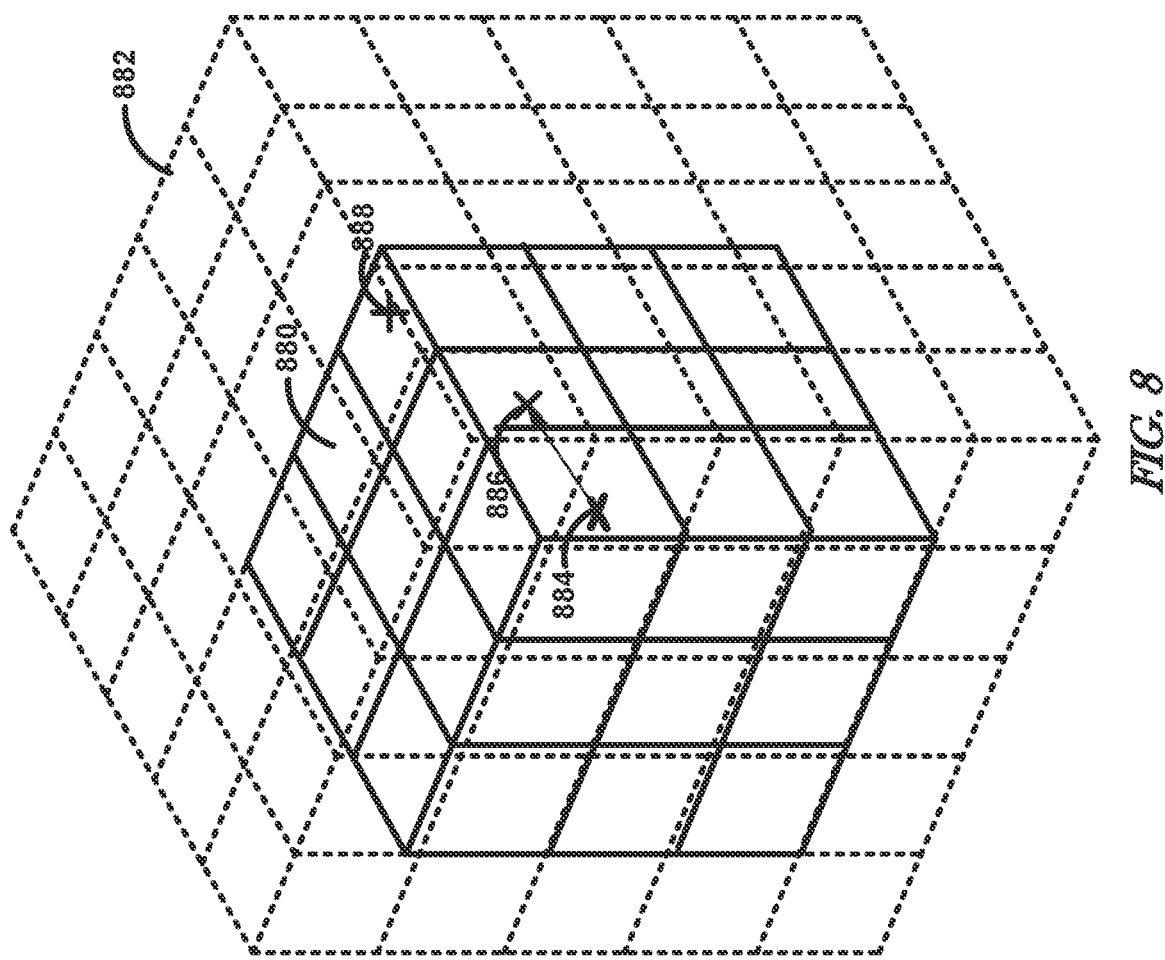
FIG. 8 illustrates, by way of example, a diagram of an embodiment of a 3D SV grid and center updating based on a new input.

FIGS. 8 illustrates, by way of example, a diagram of an embodiment of a 3D SV grid and center updating based on a new input. A current center 884 is illustrated being updated to new center 886, in response to new input 888 being mapped to the group of cells 880. The new input 888, in the example of 888 is mapped inside a virtual extent 882, but outside a current extent of the group of cells 880.

The extent of the group of cells 880 is a cuboid in the example of FIG. 8. The cuboid can be represented by a stack of 2D SV grids. Since the illustrated extent of the cuboid is 3×3×3, the cuboid can be represented by three 2D SV grids, each 3×3 in extent (in any of the x, y, or z directions). Each of the cells of the cuboid can be associated with a key value. In the example of FIG. 8, a first 3×3 SV grid can have cells associated with key values [0, 8], a second 3×3 SV grid can have cells associated with key values [9, 17], and a third 3×3 SV grid can have cells associated with key values [18, 26]. A key value can be used to determine the (x, y, z) coordinates of a center of a cell to which an input was mapped. More details regarding how this is performed is discussed regarding FIGS. 3-6, among others.

Figure 9:
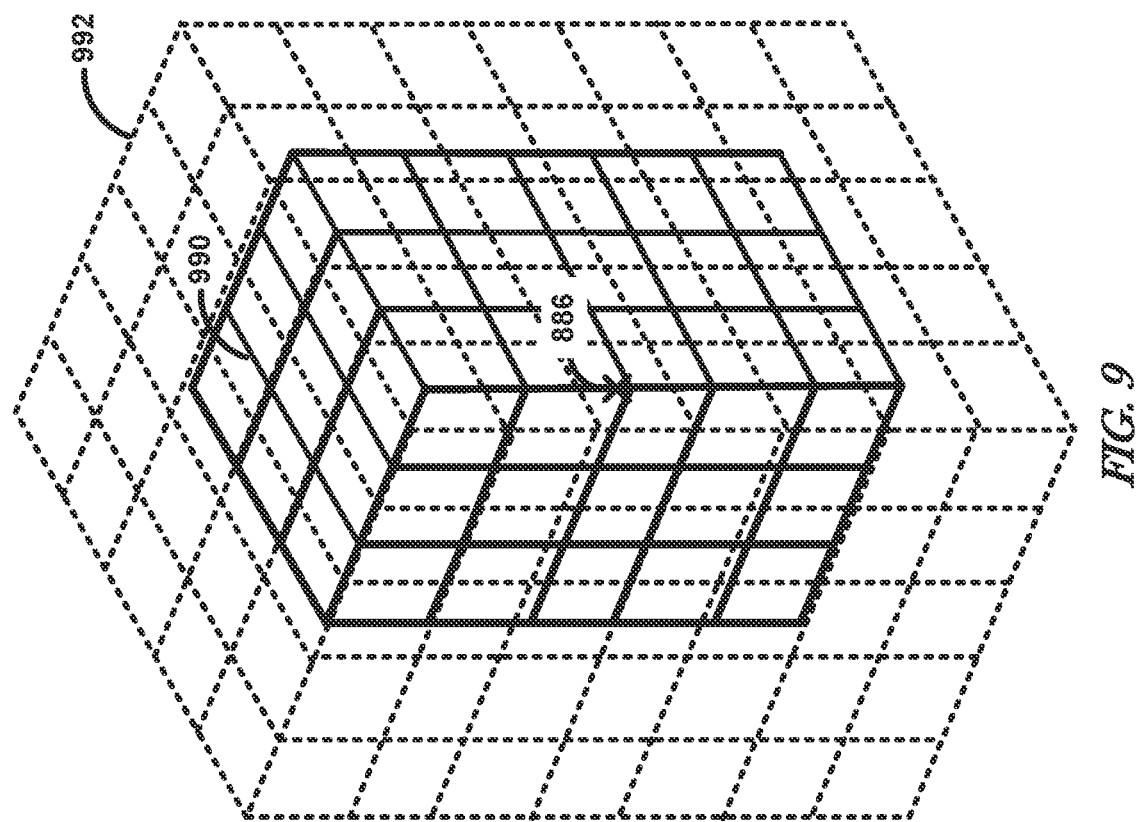
FIG. 9 illustrates, by way of example, a diagram of an embodiment of the group of cells of FIG. 8 after its extent is updated and it is moved to a new center.

FIG. 9 illustrates, by way of example, a diagram of an embodiment of the group of cells 880 of FIG. 8 after its extent is updated and it is moved to the new center 886. An extent of the group of cells 880 is changed due to the new input 888 being within the virtual extent 882, but outside the extent of the group of cells 880. A new extent 990 of the group of cells 880 is updated to be 3×3×5. The extent is changed only in the z-direction, in the example of FIG. 9, because the new input 888 is mapped to a location within the x-y extent of the group of cells 880, but outside the z extent of the group of cells 880. In other embodiments, the extent can be changed differently, as discussed previously.

In application, the center 886 of the group of cells can be returned to represent the data of interest for the object. For example, in an object tracking application, the center 886 of the group of cells representing the object can be returned as the location of the object. In such examples, the center can include Az, El, Rng, Lat, Long, Zone (in the case of Universal Transverse Mercator (UTM)), Altitude, or the like.

As can be seen, whether an input is considered part of a group (sometimes called an object in an object tracking application) is dependent on a size of a cell. The size of the cell can be chosen or configured according to an operational constraint, such as a size of a memory, compute bandwidth, or the like. The size of a cell can be chosen or configured according to a desired level of resolution for tracking. For example, a finer grained tracking can include more cells, but require more memory and compute bandwidth to operate, while a less granular tracking can include fewer cells but require less memory and bandwidth to operate.

In some embodiments, the size of a cell can be dependent on distance (e.g., Rng) from a detector (e.g., a radar or the like). Making the cell size dependent on the distance from the detector allows objects further away from the detector to meet the heuristics for being object (discussed above) and persisting as a moving object (discussed above as well).

Figure 10:
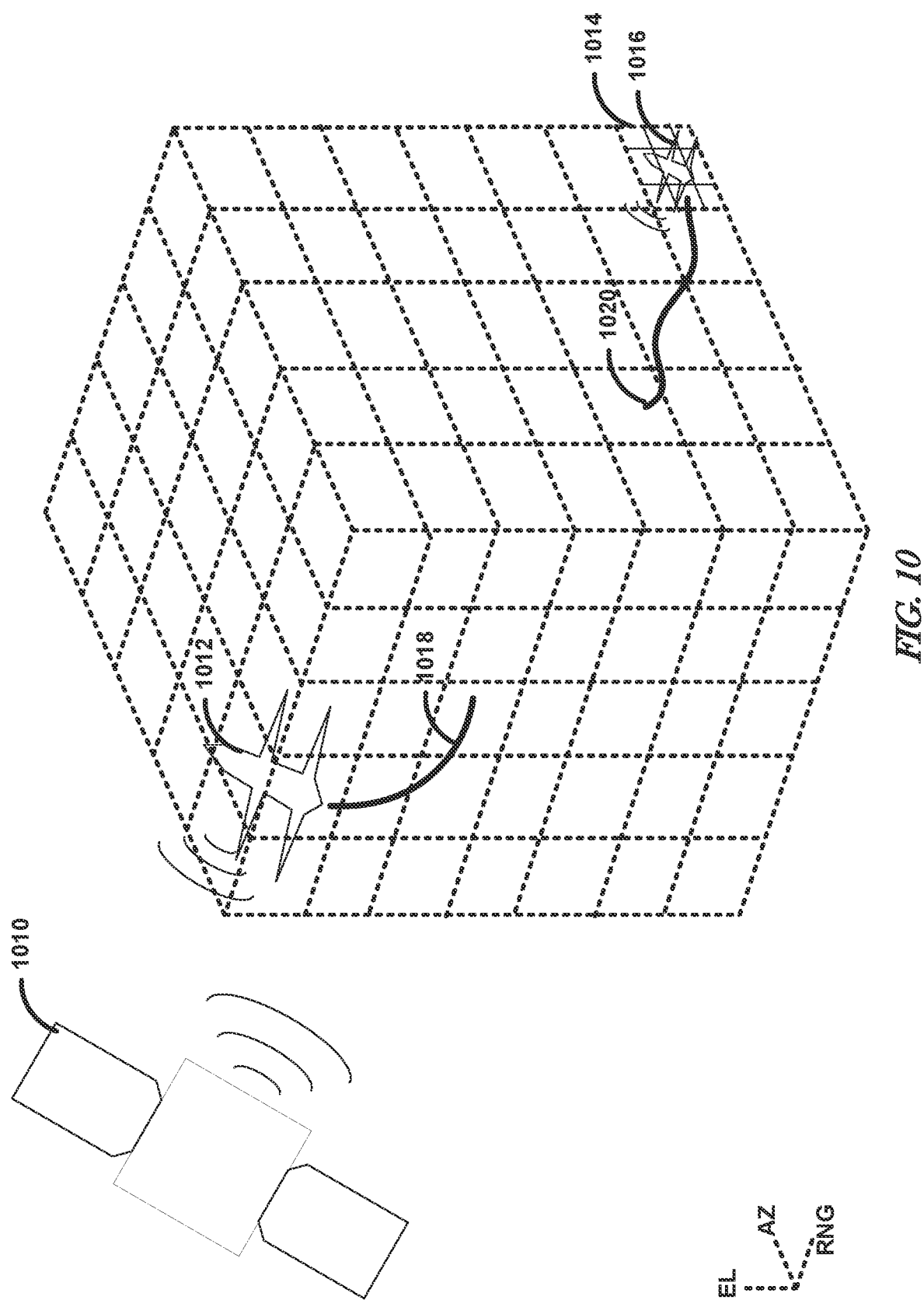
FIG. 10 illustrates, by way of example, a diagram of an embodiment of a system for object tracking.

FIG. 10 illustrates, by way of example, a diagram of an embodiment of a system for object tracking. The system includes a radar device 1010 that produces radar data (e.g., Az, El, Rng data for Constant False Alarm Rate (CFAR) hits). The radar device 1010 transmits an electromagnetic wave typically in the radio or microwave range. The wave contacts an object, such as object 1012, 1014, or Earth's surface. Part of the wave is reflected back to the radar. The properties of the wave received at the radar device 1010 indicate an object's location (Az, El, Rng) and even speed.

Consider that the object 1012 is the same size and shape as the object 1016 and the objects 1012, 1016 are travelling at the same speed. Since the object 1016 is farther away from the radar device 1010, it appears smaller than the object 1012, or unmoving as it consumes a smaller portion of a cell than the object 1012. To help alleviate this issue, the cells farther away from the radar device 1010 can have a finer granularity (smaller extent), than the cells closer to the radar device 1010. In the example of FIG. 10, a cell 1016 is split into a 3×3 grid of the same extent as a cell occupied by the object 1012.

At close range, one (1) degree of Az can be represented by one (1) SV grid cell and encompass about one (1) centimeter. At a farther range, one (1) degree of Az can be represented by SV grid cell that encompasses about one (1) kilometer. The SV grid cell representing the object that is farther away can be subdivided into a grid of cells so that each cell represents one centimeter, thus making the object detection and tracking similar at both close and far ranges. For example, for a cell that is at a one (1) meter range from the radar device 1010, a cell of the SV grid can represent a one×one×one-centimeter space and a cell of another SV grid representing an object three and a half (3.5) meters from the radar device 1010 can represent a three×three×three-centimeter space. The cell 3.5 meters away can be subdivided into a 3×3×3 grid of one-centimeter×one-centimeter×one-centimeter cells.

A track 1018 represents an object track for the object 1012 and a track 1020 represents an object track for the object 1016. The track 1018, 1021) includes points central to the SV grids (e.g., a centroid) representing the object 1018, 1020, respectively, over time. The SV grids, as previously discussed can move. This means that the extent of the SV grid remains the same, but the location in space that the SV grid represents can move. The center of the SV grids can be recorded and returned as the object track 1018, 1020.

In some embodiments, and as previously discussed, the number of cells can be adaptive, such as to be adjusted during runtime. Related to this adaptive cell size is determining the location of an encoded input in the grid and a corresponding key value associated with the encoded input. An example of determining the location in the grid includes using the following equations (fix an embodiment in which feature 1 is plotted on the x-axis and feature 2 is plotted on the y-axis):

$$\text{Col} = \text{int}((\text{feature 1} - x \text{ min})*(\text{num. col}-1)/(x \text{ range})) \quad \text{Equation 14}$$

$$\text{Row} = \text{int}((\text{feature 2} - y \text{ min})*(\text{num. row}-1)/(y \text{ range})) \quad \text{Equation 15}$$

An encoding on the grid, sometimes called key value, can be determined using Equation 16:

$$\text{Key Value} = \text{num. row}*\text{Row} + \text{Col} \quad \text{Equation 16}$$

The "x min", "y min", "x max", and "max" can be stored in the memory 116. Other values that can be stored in the memory 116 and relating to the grid of cells include "max grid size", "min grid size", or the like. These values can be used by the processing circuitry 104 to determine "x range", "num. col." "y range", or "num. row", such as to assemble the grid of cells or determine a key value for a given encoded input (e.g., (feature 1, feature 2), or more features)

A series of key values representing sequential inputs can be stored in the memory 116 and, such as to track an object. The key values can be stored and associated with the object. Key values subsequently generated by the processing circuitry 104 can be compared to the key values associated with the object to determine a trajectory or previous location of the object.

As may be evident, an SV grid can be cumbersome to store. As the resolution of the SV grid increases (e.g., more, smaller cells corresponds to a higher resolution than fewer, larger cells), the more data is required to store the SV grid and the previously seen behaviors the form of key values). For the SV grid to be used in devices with more limited memory, a more efficient description of the SV grid can be beneficial.

Figure 11:
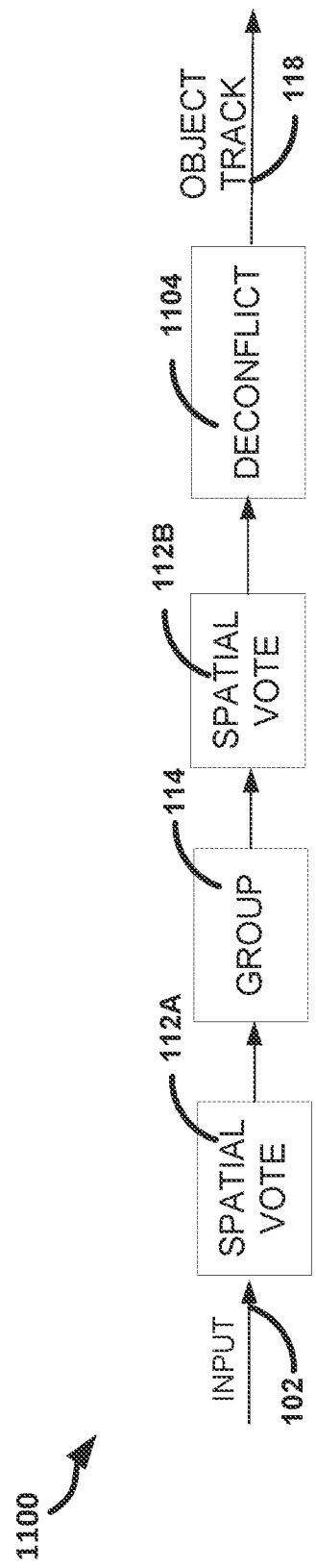
FIG. 11 illustrates, by way of example, a diagram of an embodiment of a method for object tracking using SV grids.

FIG. 11 illustrates, by way of example, a diagram of an embodiment of a method 1100 for object tracking using SV grids. The method 1100 includes receiving the input 102. The input 102 can be raw data, such as numerical, textual, or the like. As discussed previously, the input 102, if not numeric, can be converted to a number. The numeric representation of the input 102 can be spatially voted at operation 112A. The operation 112A is discussed in more detail regarding previous FIGS. Generally, the operation 112A can include mapping the input 102 (or a statistic determined based on the input 102) to a cell of a grid of cells. The grid of cells can be one dimensional (sometimes called a histogram), 2D (sometimes called a grid), or even higher-dimensional.

At operation 114, the spatially voted input can be grouped. The operation 114 is discussed in more detail elsewhere. The operation 114, in general, can include splitting the spatially voted input by proximity in voted space. Those points mapped (spatially voted) near each other tend to be mapped to a same group, while those points mapped further from each other tend to be mapped to a different group, After the operation 114, the operation 112B can be performed on data points that are determined to be a part of multiple objects (in embodiments that do not consider range, for example, or in embodiments that consider Rng, but where two objects are physically close together).

At operation 1104, the further spatially voted points from operation 112B can be deconflicted. Deconfliction includes increasing a resolution of a sub-grid that includes the points of interest and increasing a resolution of the cells of the sub-grid. If the number of cells of the sub-grid that are occupied by the points of interest after the resolution is increased is different (greater) than the number of cells occupied before the resolution was increased, the resolution of the sub-grid of cells can be further increased. If the number of cells of the sub-grid that are occupied by the points of interest after the resolution is increased is the same as the number of cells occupied before the resolution was increased, deconfliction is complete at the lower resolution.

Deconfliction can end when the number of cells occupied by the points after increasing the resolution is the same as the number of cells occupied by the points before increasing the resolution of the cells.

The result of the operation 1104 can provide an object track. The object track can be a series center values that correspond to a temporal change of the center of the group of cells representing the object.

Figure 12:
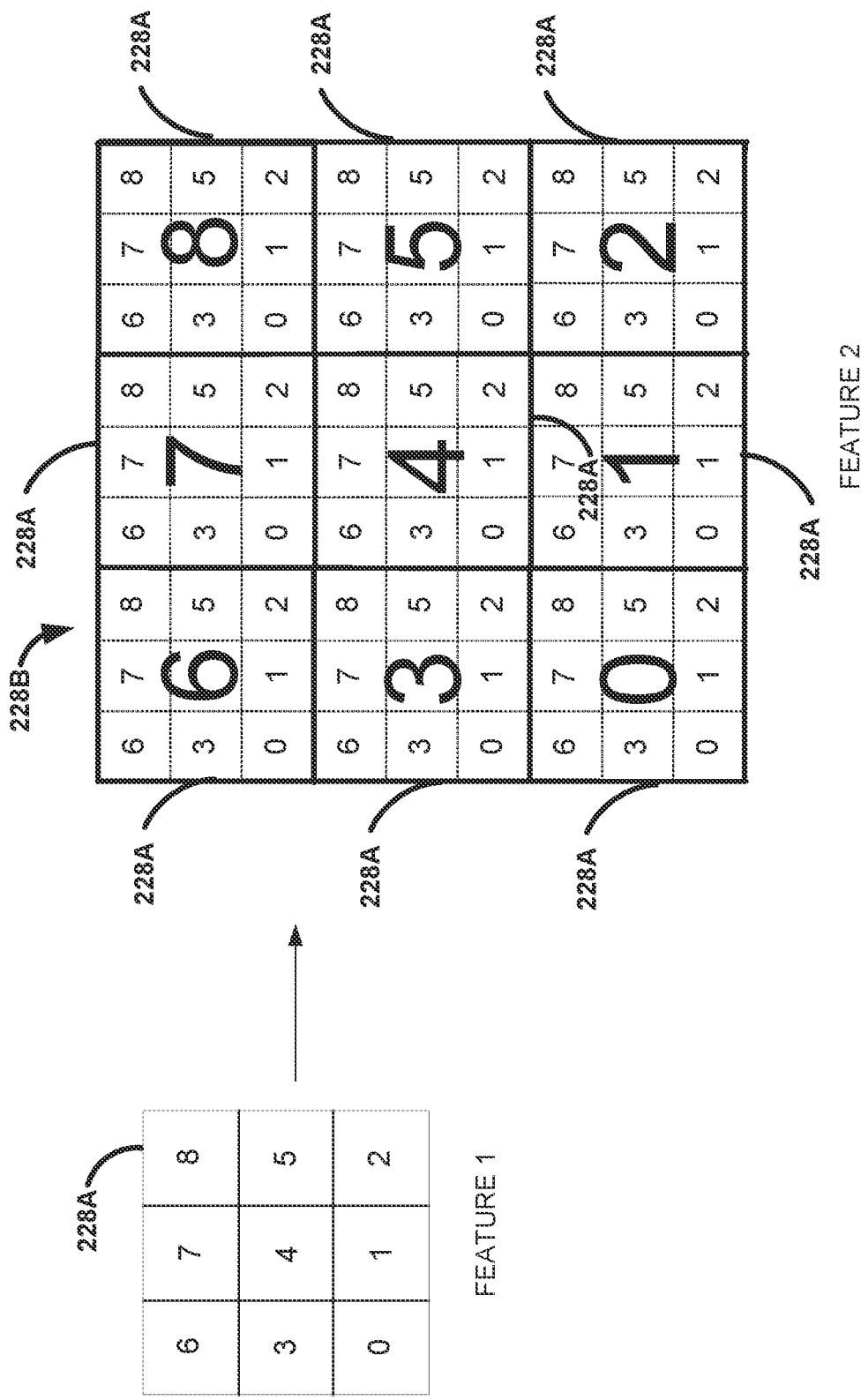
FIG. 12 illustrates, by way of example, a conceptual flow diagram of an embodiment of embedding SV grids, such as to make the SV grids nD.

FIG. 12 illustrates, by way of example, a conceptual flow diagram of an embodiment of embedding SV grids, such as to make the SV grids nD. In the embodiment of FIG. 12, features are mapped to two-dimensional SV grids, however, the concepts are equally applicable to SV grids of greater or lesser dimensions. At operation 112C, a first feature is spatially voted to an SV grid of cells 228A. In the example of FIG. 12, each feature is mapped to one of nine cells (sometimes called bins in the context of histograms). The grid of cells 228A is considered a lowest level of an embedded SV grid.

At operation 112D, a second feature is mapped to an SV grid of cells that includes the first feature and the second feature mapped thereto. The SV grid of cells 228A is mapped to each cell of the grid of cells 228B.

Figure 13:
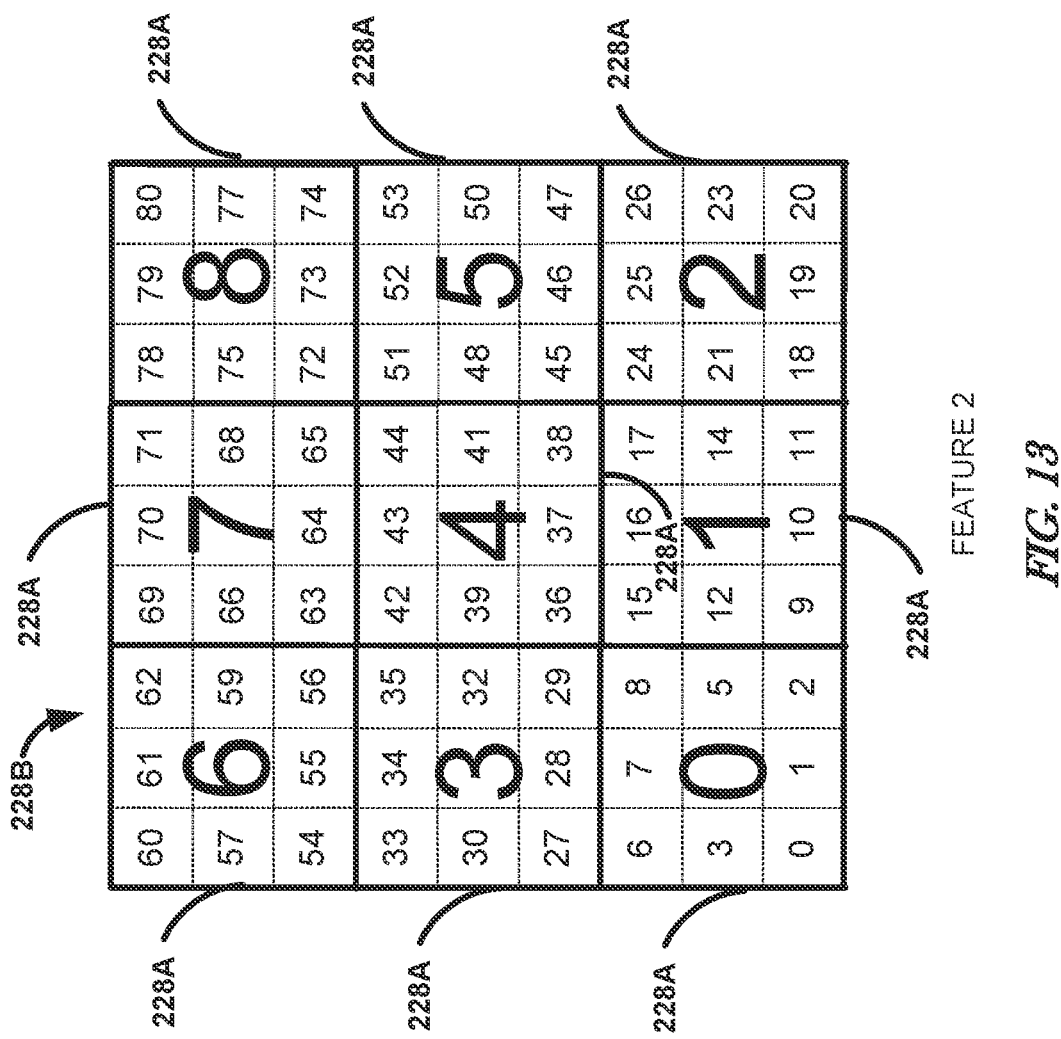
FIG. 13 illustrates, by way of example, a diagram of an embodiment of a virtual global resolution of cells.

FIG. 13 illustrates, by way of example, a diagram of an embodiment of a virtual global resolution of cells. Embedded SV grids can have a virtual global resolution. The virtual global resolution numbering is illustrated in FIG. 13.

The second feature can be mapped to the grid of cells 228B at a location corresponding to (1) the key value corresponding to the second feature and (2) within the cell of the virtual global resolution corresponding to the key value to which the first feature was mapped, Thus, if the first feature is mapped, to three and the second feature is mapped to seven, the operation 112D maps the second feature to a cell corresponding to a key value of sixty-six (66). The key value 66 corresponds to the second feature being mapped to the cell of the grid of cells 228B corresponding to key value 7. Within the cell corresponding to key value of 7, 66 corresponds to the left column, middle row thereof, the same cell the first feature is mapped to (in this example, 3) in the grid of cells 228A.

The cells to which an input has been mapped at each level of an embedded SV grid of cells can be determined based on the key value to which the input in the virtual global resolution of cells. Note that the example in FIGS. 12 and 13 corresponds to a single embedding with the SV grid of cells 228A corresponding to a first level of the embedding and the SV grid of cells 228B corresponding to a second level of the embedding. If a third SV grid of cells were to be part of the embedding, it would be considered a third level of the embedding. The highest-level number in the embedding is considered the top level and the first level is considered the bottom level. An SV grid at a higher level will have a corresponding virtual global resolution with more key values than an SV grid at a lower level (an SV grid closer to the bottom level). To determine which key values of the grid of cells to which the second feature is mapped and the grid of cells to which the first feature is mapped, a simple mathematical procedure can be performed. This procedure is:

(1) start with the highest-level SV grid of cells;
(2) divide the key value in the current level's virtual global resolution by the number of key values in the (current level minus 1) embedded grid of cells to generate an intermediate value;
(3) floor the intermediate value to determine the key value in the current level of the embedded grids of cells to which the input was mapped;
(4) if current embedding level is greater than 1, subtract, from the key value in the virtual global resolution, the key value times (the number of cells in the current grid of cells left to determine) and use that result as the key value for a next iteration to determine a key value to which an immediately previous feature was mapped, if not then all feature key values are determined and the work is done;
(5) repeat operations 2-4.

Consider an example in which each of three features of the input 102 is mapped to nine possible key values and the SV grids are embedded. Consider further that the first feature is mapped to key value 3. the second feature is mapped to key value 7, and the third feature is mapped to key value 1. The resulting key value in the virtual global resolution, after spatial voting the features and embedding the grids of cells, would be one hundred forty-seven (147).

To determine which key value the third feature was mapped to, take 147 and divide by 9*9=147/81=1.81. Remember that the possible number of key values to which each feature is mapped is 9 in this example and the number of features to be determined is 3 in this example. 3 minus 1 is 2. The floor of 1.81 is 1. Thus, the key value to which the third feature was mapped is 1. Now, there are two more key values left to determine, so subtract 1*9*9 (the key value of the third feature times the number of key values for the third grid (9) raised to the number of key values left to determine (2)) from 147 to get 66 and repeat steps 2-4.

In this example, take 66 and divide by 9=66/9=7.33. Remember that the possible number of key values to which each feature is mapped is 9 and the number of features left to be determined is 2. 2 minus 1 is 1. The floor of 7.33 is 7. Thus, the key value to which the second feature was mapped is 7. Now, there is one more key value left to determine, so subtract 7*9 (the key value of the third feature times the number of key values in the SV grid of cells of the second feature raised to the number of key values left to determine) from 66 to get 3 and repeat steps 2-4. The last key value is determined as 3.

By embedding the SV grids as in FIGS. 12 and 13, an improved SV grid representation efficiency, in terms of memory space is consumed and anomaly testing computations can be realized. With an embedded SV grid, the extent of each of the cells of the SV grid, minimum and maximum values of each of the features, and the like can be stored. The only number needed to indicate all feature values is the key value in the highest level virtual global resolution. In this example, 147. To encode this value, the RLE can be "0, 147, 1" can stored to indicate that starting at value "0", 147 occurrences of 0 occur (keys 0 to 146) and then 1 key value is populated (the 147$^{th}$ key), and no further keys are populated.

A feature value at each level of the embedded SV grids of cells can be determined as a center value of the cell corresponding to the key value. The center value can be determined as feature value=minimum of feature value+ (maximum of feature value−minimum of feature value)* (key value+0.5)/number of key values in SV grid of cells within the feature (not the virtual global resolution of the grid of cells).

Figure 14:
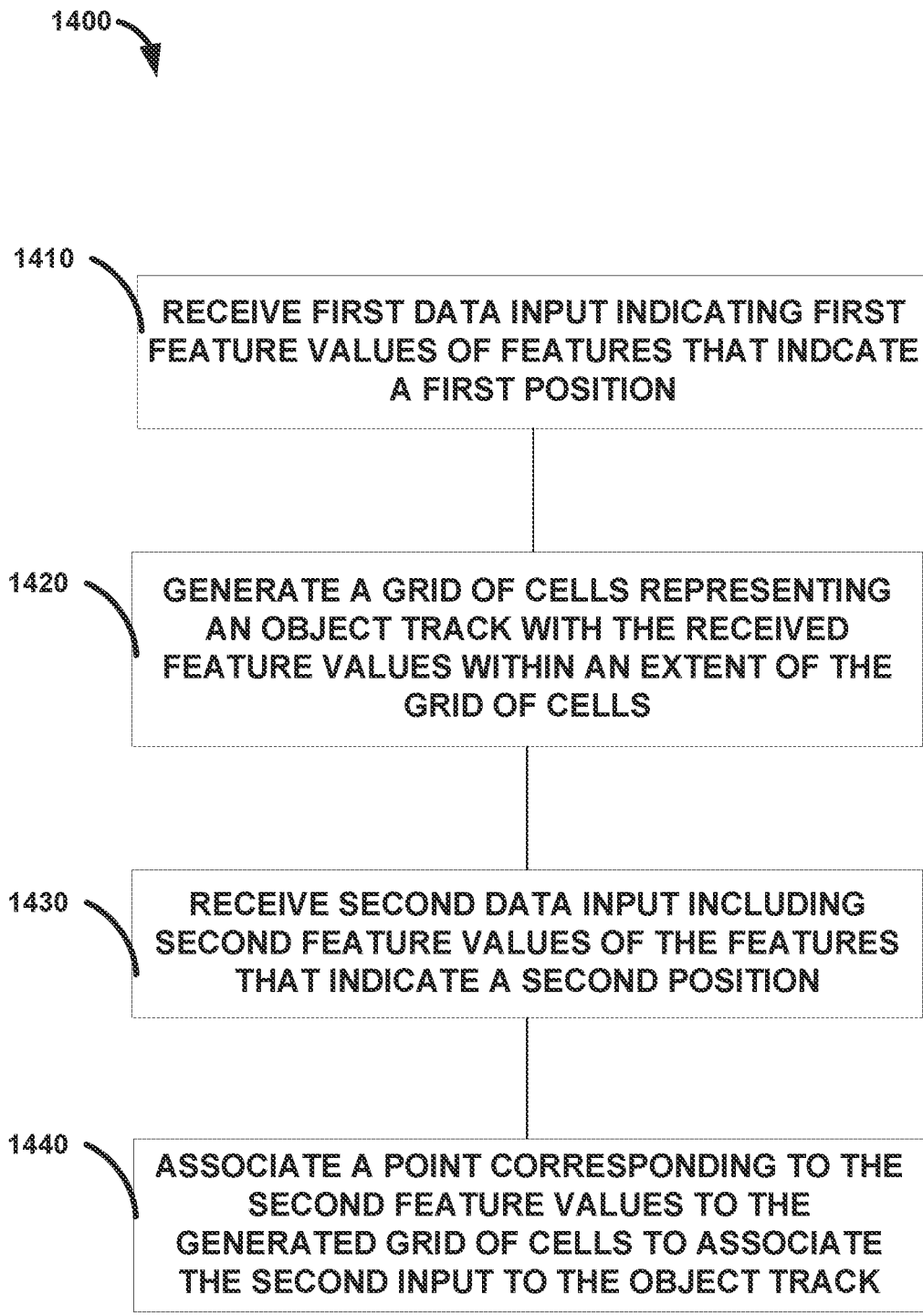
FIG. 14 illustrates, by way of example, a diagram of an embodiment of a method for object tracking using an SV grid.

FIG. 14 illustrates, by way of example, a diagram of an embodiment a method 1400 for object tracking using spatial voting. The method 1400 as illustrated includes receiving first data input including first feature values of features that indicate a first position, at operation 1410; generating a second grid of cells representing an object track with the received feature values within an extent of the grid of cells, at operation 1420; receiving second data input including second feature values of the features that indicate a second position, at operation 1430; and in response to determining the second feature values are within the extent of the grid of cells adding a point corresponding to the second feature values to the second grid of cells to associate the second input to an object back, at operation 1440.

The method 1400 can further include moving the grid of cells based on the second feature values. The method 1400 can further include, wherein the features include at least of two of azimuth, elevation, range, latitude, longitude, and altitude. The method 1400 can further include associating the grid of cells with an object number in response to receiving a specified number of inputs within the extent of the grid of cells. The method 1400 can further include, wherein associating the grid of cells with the object number occurs only if the specified number of inputs are within the extent of the grid of cells and are a specified distance away from each other on the grid of cells.

The method 1400 can further include increasing the number of row of cells or number of columns of cells of the grid of cells in response to receiving a third data input, including third feature values of the features that indicate a third position within a virtual extent of the grid of cells and outside the extent of the grid of cells, the virtual extent contiguous with the extent and extending outward from a perimeter of the extent. The method 1400 can further include increasing the number of rows of cells if the third feature values are above or below the current extent and increase the number of columns of cells if the third feature values are right or left of the current extent.

The method 1400 can further include, wherein the object is a first object and generating a second grid of cells in response to receiving a third data input, including third values of the features that indicate a third position outside a virtual extent of the grid of cells, the virtual extent contiguous with the extent and extending outward from a perimeter of the extent, and return a central location of the second grid of cells as a location of the second object. The method 1400 can further include removing data in the memory corresponding to the grid of cells in response to either (a) not receiving an input mapped within the extent or a virtual extent of the grid of cells within a specified period of time or number of continuous inputs, or (b) not receiving an input mapped within the extent or the virtual extent of the grid of cells that is a threshold distance away from a last input within the grid of cells.

The method 1400 can further include generating a stationary grid of cells that includes points removed from another grid of cells and any inputs received that are not part of any grid of cells. The method 1400 can further include returning a point central to the grid of cells as a position of the object.

Figure 15:
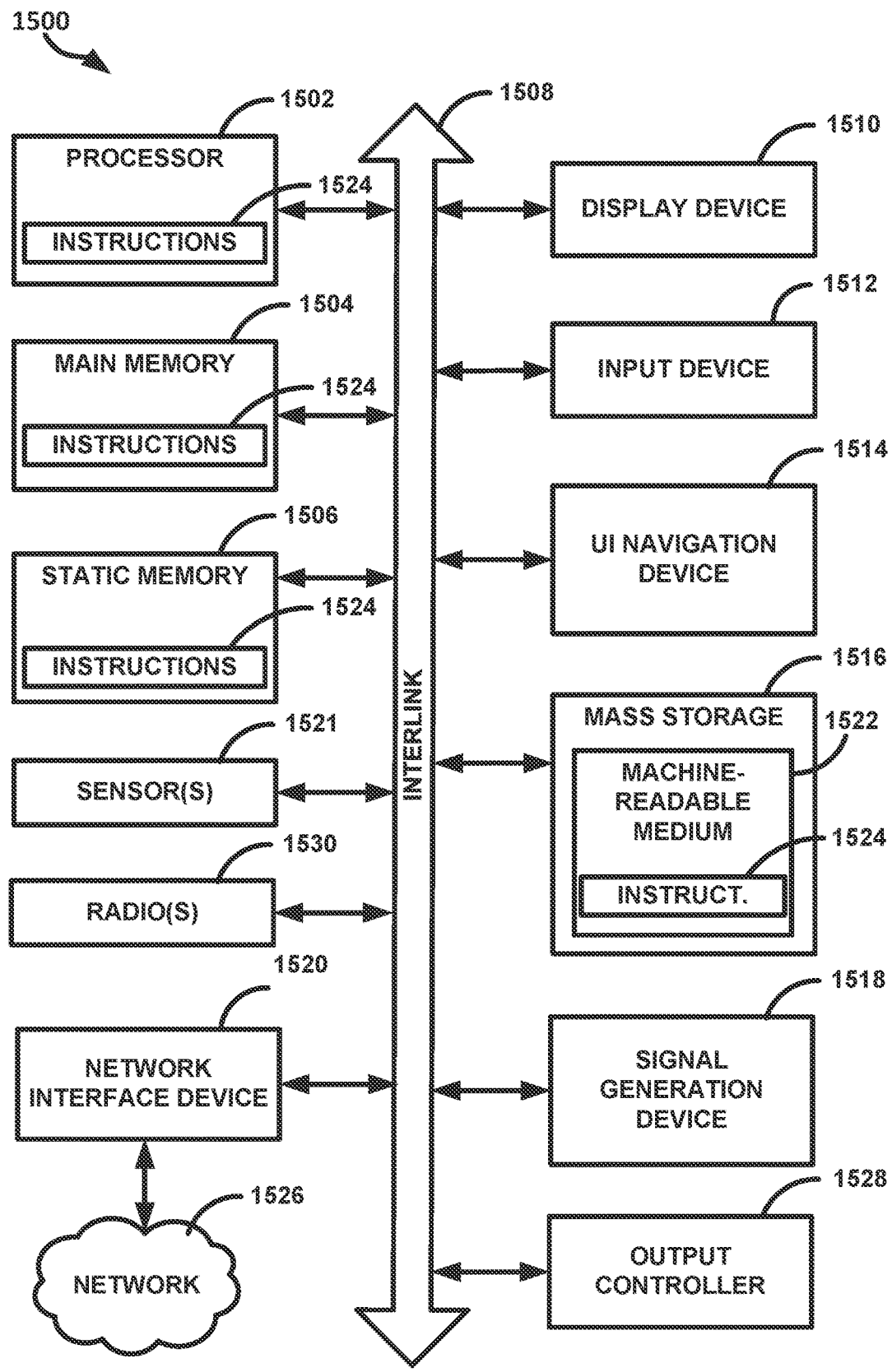
FIG. 15 illustrates, by way of example, a block diagram of an embodiment of a machine on which one or more of the methods, such as those discussed about FIGS. 1-14 can be implemented.

FIG. 15 illustrates, by way of example, a block diagram of an embodiment of a machine 1500 on which one or more of the methods, such as those discussed about FIGS. 1-14 can be implemented. In one or more embodiments, one or more items of the system 100, 1100 can be implemented by the machine 1500. In alternative embodiments, the machine 1500 operates as a standalone device or may be connected (e.g., networked) to other machines. In one or more embodiments, one or more items of the system 100, 1100 can include one or more of the items of the machine 1500.

In a networked deployment, the machine 1500 may operate in the capacity of a server or a client machine in server-client network environment, or as a peer machine in a peer-to-peer (or distributed) network environment. The machine 1500 may be a personal computer (PC), a tablet PC, a set-top box (STB), a Personal Digital Assistant (PDA), a cellular telephone, a web appliance, a network router, switch or bridge, embedded computer or hardware, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 1500 includes processing circuitry 1502 (e.g., a hardware processor, such as can include a central processing unit (CPU), a graphics processing unit (GPU), an application specific integrated circuit, circuitry, such as one or more transistors, resistors, capacitors, inductors, diodes, logic gates, multiplexers, oscillators, buffers, modulators, regulators, amplifiers, demodulators, or radios (e.g., transmit circuitry or receive circuitry or transceiver circuitry, such as RF or other electromagnetic, optical, audio, non-audible acoustic, or the like), sensors 1521 (e.g., a transducer that converts one form of energy (e.g., light, heat, electrical, mechanical, or other energy) to another form of energy), or the like, or a combination thereof), a main memory 1504 and a static memory 1506, which communicate with each other and all other elements of machine 1500 via a bus 1508. The transmit circuitry or receive circuitry can include one or more antennas, oscillators, modulators, regulators, amplifiers, demodulators, optical receivers or transmitters, acoustic receivers e.g., microphones) or transmitters (e.g., speakers) or the like. The RF transmit circuitry can be configured to produce energy at a specified primary frequency to include a specified harmonic frequency.

The machine 1500 (e.g., computer system) may further include a video display unit 1510 (e.g., a liquid crystal display (LCD) or a cathode ray tube (CRT)). The machine 1500 also includes an alphanumeric input device 1512 (e.g., a keyboard), a user interface (UI) navigation device 1514 (e.g., a mouse), a disk drive or mass storage unit 1516, a signal generation device 1518 (e.g., a speaker) and a network interface device 1520.

The mass storage unit 1516 includes a machine-readable medium 1522 on which is stored one or more sets of instructions and data structures (e.g., software) 2324 embodying or utilized by any one or more of the methodologies or functions described herein. The instructions 1524 may also reside, completely or al least partially, within the main memory 1504 and/or within the processing circuitry 1502 during execution thereof by the machine 1500, the main memory 1504 and the processing circuitry 1502 also constituting machine-readable media. One or more of the main memory 1504, the mass storage unit 1516, or other memory device can store the data of the memory 116 for executing a method discussed herein.

The machine 1500 as illustrated includes an output controller 1528. The output controller 1528 manages data flow to/from the machine 1500. The output controller 1528 is sometimes called a device controller, with software that directly interacts with the output controller 1528 being called a device driver.

While the machine-readable medium 1522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that can store, encode or carry instructions for execution by the machine and that cause the machine to perform any one or more of the methodologies of the present invention, or that can store, encode or carry data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1524 may further be transmitted or received over a communications network 1526 using a transmission medium. The instructions 1524 may be transmitted using the network interface device 1520 and any one of several well-known transfer protocols (e.g., hypertext transfer protocol (HTTP), user datagram protocol (UDP), transmission control protocol (TCP)/internet protocol (IP)). The network 1526 can include a point-to-point link using a serial protocol, or other well-known transfer protocol. Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that can store, encode or carry instructions for execution by the machine, and includes digital or analog communications signals or other intangible media to facilitate communication of such software.

EXAMPLES AND ADDITIONAL NOTES

Example 1 can include an apparatus for tracking an object, the apparatus comprising a memory including data indicating parameters for a grid of cells, the parameters including a cell size, a number of columns of cells, a number of rows of cells, and key values for the cells, processing circuitry coupled to the memory, the processing circuitry configured to receive first data input including first feature values of features that indicate a first position, generate a grid of cells representing an object track with the received feature values within an extent of the grid of cells, receive second data input including second feature values of the features that indicate a second position, and in response to determining the second feature values are within the extent of the grid of cells adding a point corresponding to the second feature values to the grid of cells to associate the point to an object track.

In Example 2, Example 1 can further include, wherein the processing circuitry is further configured to move the grid of cells based on the second feature values.

In Example 3, at least one of Examples 1-2 can further include, wherein the features include at least of two of azimuth, elevation, range, latitude, longitude, and altitude.

In Example 4, at least one of Examples 1-3 can further include, wherein the processing circuitry is further configured to associate the grid of cells with an object number in response to receiving a specified number of inputs within the extent of the grid of cells.

In Example 5, Example 4 can further include, wherein associating the grid of cells with the object number occurs only if the specified number of inputs are within the extent of the grid of cells and are a specified distance away from each other on the grid of cells.

In Example 6, at least one of Examples 1-5 can further include, wherein the processing circuitry is further configured to increase the number of row of cells or number of columns of cells of the grid of cells in response to receiving a third data input, including third feature values of the features that indicate a third position within a virtual extent of the grid of cells and outside the extent of the grid of cells, the virtual extent contiguous with the extent and extending outward from a perimeter of the extent.

In Example 7, Example 6 can further include, wherein the processing circuitry is configured to increase the number of rows of cells if the third feature values are above or below the current extent and increase the number of columns of cells if the third feature values are right or left of the current extent.

In Example 8, at least one of Examples 1-7 can further include, wherein the object is a first object and the processing circuitry is further configured to generate a second grid of cells in response to receiving a third data input, including third values of the features that indicate a third position outside a virtual extent of the grid of cells, the virtual extent contiguous with the extent and extending outward from a perimeter of the extent, and return a central location of the second grid of cells as a location of the second object.

In Example 9, at least one of Examples 1-8 can further include, wherein the processing circuitry is further configured to remove data in the memory corresponding to the grid of cells in response to either (a) not receiving an input mapped within the extent or a virtual extent of the grid of cells within a specified period of time or number of continuous inputs, or (b) not receiving an input mapped within the extent or the virtual extent of the grid of cells that is a threshold distance away from a last input within the grid of cells.

In Example 10, at least one of Examples 1-9 can further include, wherein the processing circuitry is further configured to generate a stationary grid of cells that includes points removed from another grid of cells and any inputs received that are not part of any grid of cells.

In Example 11, at least one of Examples 1-10 can further include, wherein the processing circuitry is further configured to return a point central to the grid of cells as a position of the object.

Example 12 can include a method for tracking an object, the method comprising receiving first data input including first feature values of features that indicate a first position, generating a grid of cells representing an object track with the received feature values within an extent of the grid of cells, receiving second data input including second feature values of the features that indicate a second position, and in response to determining the second feature values are within the extent of the grid of cells adding a point corresponding to the second feature values to the grid of cells to associate the point to an object track.

In Example 13, Example 12 can further include moving the grid of cells based on the second feature values.

In Example 14, at least one of Examples 12-13 can further include, wherein the features include at least of two of azimuth, elevation, range, latitude, longitude, and altitude.

In Example 15. at least one of Examples 12-14 can further include associating the grid of cells with an object number in response to receiving a specified number of inputs within the extent of the grid of cells only if the specified number of inputs are within the extent of the grid of cells and are a specified distance away from each other on the grid of cells.

Example 16 includes a non-transitory machine-readable medium including instructions that, when executed by a machine, cause the machine to perform operations for tracking an object, the operations comprising receiving first data input including first feature values of features that indicate a first position, generating a grid of cells representing an object track with the received feature values within an extent of the grid of cells, receiving second data input including second feature values of the features that indicate a second position, and in response to determining the second feature values are within the extent of the grid of cells adding a point corresponding to the second feature values to the grid of cells to associate the point to an object track.

In Example 17, Example 16 can further include, wherein the operations further include increasing the number of row of cells or number of columns of cells of the grid of cells in response to receiving a third data input, including third feature values of the features that indicate a third position within a virtual extent of the grid of cells and outside the extent of the grid of cells, the virtual extent contiguous with the extent and extending outward from a perimeter of the extent.

In Example 18, Example 17 can further include, wherein the operations further include increasing the number of rows of cells if the third feature values are above or below the current extent and increase the number of columns of cells if the third feature values are right or left of the current extent.

In Example 19, at least one of Examples 16-18 can further include, wherein the object is a first object and the operations further include generating a second grid of cells in response to receiving a third data input, including third values of the features that indicate a third position outside a virtual extent of the grid of cells, the virtual extent contiguous with the extent and extending outward from a perimeter of the extent, and returning a central location of the second grid of cells as a location of the second object.

In Example 20, at least one of Examples 16-19 can further include, wherein the operations further include removing data in the memory corresponding to the grid of cells in response to either (a) not receiving an input mapped within the extent or a virtual extent of the grid of cells within a specified period of time or number of continuous inputs, or (b) not receiving an input mapped within the extent or the virtual extent of the grid of cells that is a threshold distance away from a last input within the grid of cells.

Although an embodiment has been described with reference to specific example embodiments, it will be evident that various modifications and changes max be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. An apparatus for tracking an object, the apparatus comprising:
a radar configured to produce radio waves and determine feature values of objects that reflect the radio waves;
a memory including data indicating parameters for grids of cells, the parameters including a cell size, a number of columns of cells, a number of rows of cells, and key values for the cells, each of the grids of cells representing respective different object tracks;
processing circuitry coupled to the memory and the radar, the processing circuitry configured to:
receive first data input including first feature values of the feature values that indicate a first position;
generate a first grid of cells of the grids of cells, the first grid of cells representing a first object track of the respective different object tracks of a first object with the first position within an extent of the first grid of cells;
receive second data input including second feature values of the feature values that indicate a second position;
in response to determining the second feature values are within the extent of the first grid of cells adding a point corresponding to the second feature values to the first grid of cells to associate the second input to the first object track;
receive third data input including third feature values of the feature values that indicate a third position;
in response to determining the third feature values are outside the extent of the first grid of cells generate a second grid of cells of the grids of cells, the second grid of cells representing a second object track of the respective different object tracks of a second object with the third position within an extent of a third grid of cells; and
adding a point corresponding to the third feature values to the second grid of cells to associate the third input to the second object track.

2. The apparatus of claim 1, wherein the processing circuitry is further configured to move the second grid of cells based on the second feature values.

3. The apparatus of claim 1, wherein the features include at least of two of azimuth, elevation, range, latitude, longitude, and altitude.

4. The apparatus of claim 1, wherein the processing circuitry is further configured to associate the second grid of cells with an object number in response to receiving a specified number of inputs within the extent of the grid of cells.

5. The apparatus of claim 4, wherein associating the second grid of cells with the object number occurs only if the specified number of inputs are within the extent of the second grid of cells and are a specified distance away from each other on the second grid of cells.

6. The apparatus of claim 1, wherein the processing circuitry is further configured to increase the number of row of cells or number of columns of cells of the second grid of cells in response to receiving the third data input, including the third feature values of the features that indicate the third position within a virtual extent of the second grid of cells and outside the extent of the grid of cells, the virtual extent contiguous with the extent and extending outward from a perimeter of the extent.

7. The apparatus of claim 6, wherein the processing circuitry is configured to increase the number of rows of cells if the third feature values are above or below a current extent and increase the number of columns of cells if the third feature values are right or left of the current extent.

8. The apparatus of claim 1, wherein the object is a first object and the processing circuitry is further configured to generate the third grid of cells in response to receiving the third data input, including the third feature values of the features that indicate the third position outside a virtual extent of the second grid of cells, the virtual extent contiguous with the extent and extending outward from a perimeter of the extent, and return a central location of the third grid of cells as a location of the second object.

9. The apparatus of claim 1, wherein the processing circuitry is further configured to remove data in the memory corresponding to the second grid of cells in response to either (a) not receiving an input mapped within the extent or a virtual extent of the second grid of cells within a specified period of time or number of continuous inputs, or (b) not receiving an input mapped within the extent or the virtual extent of the second grid of cells that is a threshold distance away from a last input within the second grid of cells.

10. The apparatus of claim 1, wherein the processing circuitry is further configured to generate a stationary grid of cells that includes points removed from another grid of cells and any inputs received that are not part of any grid of cells.

11. The apparatus of claim 1, wherein the processing circuitry is further configured to return a point central to the second grid of cells as a position of the object.

12. A method for tracking an object, the method comprising:
receiving, from a radar configured to produce radio waves and determine feature values of objects that reflect the radio waves and by processing circuitry, first data input including first feature values of features that indicate a first position;
generating, by the processing circuitry, a first grid of cells representing a first object track of respective different object tracks with the received first feature values within an extent of the first grid of cells;
receiving, from the radar and by the processing circuitry, second data input including second feature values of the feature values that indicate a second position;
determining the second feature values are within the extent of the first grid of cells;
in response to determining the second feature values are within the extent of the first grid of cells, adding a point corresponding to the second feature values to the first grid of cells to associate the second input to the first object track;
receiving third data input including third feature values of the feature values that indicate a third position;
determining the third feature values are outside the extent of the first grid of cells;
in response to determining the third feature values are outside the extent of the first grid of cells, generating a second grid of cells of the grids of cells, the second grid of cells representing a second object track of the respective different object tracks of a second object with the third position within an extent of a third grid of cells; and
adding a point corresponding to the third feature values to the second grid of cells to associate the third input to the second object track.

13. The method of claim 12, further comprising moving the first grid of cells based on the second feature values.

14. The method of claim 12, wherein the features include at least of two of azimuth, elevation, range, latitude, longitude, and altitude.

15. The method of claim 12, further comprising associating the first grid of cells with an object number in response to receiving a specified number of inputs within an extent of the first grid of cells only if the specified number of inputs are within the extent of the first grid of cells and are a specified distance away from each other on the first grid of cells.

16. A non-transitory machine-readable medium including instructions that, when executed by a machine, cause the machine to perform operations for tracking an object, the operations comprising:
receiving, from a radar configured to produce radio waves and determine feature values of objects that reflect the radio waves, first data input including first feature values of features that indicate a first position in a first grid of cells;
generating a grid of cells representing a first object track of respective different object tracks with the received first feature values within an extent of the first grid of cells;
receiving second data input including second feature values of the feature values that indicate a second position;
determining the second feature values are within the extent of the first grid of cells;
in response to determining the second feature values are within the extent of the first grid of cells adding a point corresponding to the second feature values to the first grid of cells to associate the second input to the first object track;
receiving third data input including third feature values of the feature values that indicate a third position;
determining the third feature values are outside the extent of the first grid of cells;
in response to determining the third feature values are outside the extent of the first grid of cells, generating a second grid of cells of the grids of cells, the second grid of cells representing a second object track of the respective different object tracks of a second object with the third position within an extent of a third grid of cells; and
adding a point corresponding to the third feature values to the second grid of cells to associate the third input to the second object track.

17. The non-transitory machine-readable medium of claim 16, wherein the operations further include increasing a number of row of cells or number of columns of cells of the first grid of cells in response to receiving the third data input, including the third feature values of the features that indicate the third position within a virtual extent of the grid of cells and outside the extent of the first grid of cells, the virtual extent contiguous with the extent and extending outward from a perimeter of the extent.

18. The non-transitory machine-readable medium of claim 17, wherein the operations further include increasing the number of rows of cells if the third feature values are above or below a current extent and increase the number of columns of cells if the third feature values are right or left of the current extent.

19. The non-transitory machine-readable medium of claim 16, wherein the object is a first object and the operations further include generating a second grid of cells in response to receiving the third data input, including the third feature values of the features that indicate the third position outside a virtual extent of the grid of cells, the virtual extent contiguous with the extent and extending outward from a perimeter of the extent, and returning a central location of the second grid of cells as a location of the second object.

20. The non-transitory machine-readable medium of claim 16, wherein the operations further include removing data in a memory corresponding to the first grid of cells in response to either (a) not receiving an input mapped within the extent or a virtual extent of the first grid of cells within a specified period of time or number of continuous inputs, or (b) not receiving an input mapped within the extent or the virtual extent of the first grid of cells that is a threshold distance away from a last input within the first grid of cells.

* * * * *